United States Patent
Bruce et al.

(10) Patent No.: US 10,430,303 B1
(45) Date of Patent: *Oct. 1, 2019

(54) BUS ARBITRATION WITH ROUTING AND FAILOVER MECHANISM

(71) Applicant: BITMICRO Networks, Inc., Fremont, CA (US)

(72) Inventors: Ricardo H. Bruce, Fremont, CA (US); Cyrill Coronel Ponce, Malabon (PH); Jarmie Dela Cruz Espuerta, Bacolod (PH); Marlon Basa Verdan, Fremont, CA (US)

(73) Assignee: BiTMICRO Networks, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,147

(22) Filed: Feb. 7, 2018

Related U.S. Application Data

(63) Continuation of application No. 14/688,209, filed on Apr. 16, 2015, now Pat. No. 9,916,213, which is a
(Continued)

(51) Int. Cl.
*G06F 11/20* (2006.01)
*G06F 13/16* (2006.01)
*G06F 13/40* (2006.01)

(52) U.S. Cl.
CPC ........ *G06F 11/2007* (2013.01); *G06F 11/202* (2013.01); *G06F 11/2002* (2013.01);
(Continued)

(58) Field of Classification Search
None
See application file for complete search history.

(56) References Cited

U.S. PATENT DOCUMENTS

| | | | | |
|---|---|---|---|---|
| 5,136,498 A | * | 8/1992 | McLaughlin | ....... G06F 11/2017 700/3 |
| 5,987,621 A | * | 11/1999 | Duso | ................... G06F 11/2023 348/E5.008 |

(Continued)

OTHER PUBLICATIONS

'Amazon Route 53 Developer Guide' API Version Apr. 1, 2013, copyright 2017 by Amazon Web Services.*
(Continued)

*Primary Examiner* — Steven G Snyder
(74) *Attorney, Agent, or Firm* — Adams Intellex, PLC

(57) ABSTRACT

In an embodiment of the invention, an apparatus comprises: a plurality of bus masters and a plurality of bus arbiters to support routing and failover, wherein each bus arbiter is coupled to a plurality of bus masters; and a central processing unit (CPU) coupled to at least one of the bus arbiters; wherein the CPU is configured to execute a firmware that chooses bus re-routing or failover in response to a bus failure. In another embodiment of the invention, a method comprises: choosing, by a central processing unit (CPU) coupled to a plurality of bus arbiters, bus re-routing or failover in response to a bus failure. In yet another embodiment of the invention, an article of manufacture, comprises a non-transient computer-readable medium having stored thereon instructions that permit a method comprising: choosing, by a central processing unit (CPU) coupled to a plurality of bus arbiters, bus re-routing or failover in response to a bus failure.

22 Claims, 17 Drawing Sheets

Related U.S. Application Data continuation-in-part of application No. 14/216,627, filed on Mar. 17, 2014, now Pat. No. 9,798,688.

(60) Provisional application No. 61/980,569, filed on Apr. 17, 2014, provisional application No. 61/789,644, filed on Mar. 15, 2013.

(52) U.S. Cl.
CPC ...... *G06F 11/2005* (2013.01); *G06F 11/2017* (2013.01); *G06F 11/2023* (2013.01); *G06F 11/2041* (2013.01); *G06F 13/1605* (2013.01); *G06F 13/4031* (2013.01)

(56) References Cited

U.S. PATENT DOCUMENTS

| | | | | |
|---|---|---|---|---|
| 6,539,451 B1* | 3/2003 | Zani | ............. | G06F 11/2005 710/110 |
| 6,574,142 B2* | 6/2003 | Gelke | ............. | G11C 16/102 365/185.11 |
| 6,999,411 B1* | 2/2006 | Brewer | ............. | H04L 45/28 370/220 |
| 7,349,903 B2* | 3/2008 | Clark | ............. | G06F 11/2005 |
| 7,797,292 B2* | 9/2010 | Clark | ............. | G06F 11/2005 707/636 |
| 8,341,300 B1* | 12/2012 | Karamcheti | ............. | G06F 13/1642 710/6 |
| 8,489,914 B2* | 7/2013 | Cagno | ............. | G06F 11/2089 714/11 |
| 9,201,790 B2* | 12/2015 | Keeler | ............. | G06F 3/0607 |
| 9,460,042 B2* | 10/2016 | Iskandar | ............. | G06F 13/4031 |
| 9,916,213 B1* | 3/2018 | Bruce | ............. | G06F 11/2007 |
| 2002/0011607 A1* | 1/2002 | Gelke | ............. | G11C 16/102 257/200 |
| 2002/0013880 A1* | 1/2002 | Gappisch | ............. | G11C 7/10 711/103 |
| 2004/0078632 A1* | 4/2004 | Infante | ............. | G06F 3/0613 714/4.2 |
| 2005/0055481 A1* | 3/2005 | Chou | ............. | G06F 13/387 710/52 |
| 2005/0102456 A1* | 5/2005 | Kang | ............. | G06F 13/4031 710/113 |
| 2006/0106823 A1* | 5/2006 | Clark | ............. | G06F 11/2005 |
| 2008/0147869 A1* | 6/2008 | Clark | ............. | G06F 11/2005 709/227 |
| 2012/0215973 A1* | 8/2012 | Cagno | ............. | G06F 11/2089 711/103 |

OTHER PUBLICATIONS

'Host Bus Adapters (HBAs): What you need to know about a storage networking workhorse' by Alan Earls, Feb. 2003.*

* cited by examiner

BUS ARBITRATION WITH ROUTING AND FAILOVER MECHANISM

CROSS-REFERENCE(S) TO RELATED APPLICATIONS

This application is a continuation application of U.S. application Ser. No. 14/688,209, which claims the benefit of and priority to U.S. Provisional Application 61/980,569, filed 17 Apr. 2014. This U.S. Provisional Application 61/980,569 is hereby fully incorporated herein by reference. U.S. application Ser. No. 14/688,209 is hereby fully incorporated herein by reference.

This application is a continuation application of U.S. application Ser. No. 14/688,209 which is a continuation in part application of U.S. application Ser. No. 14/216,627, issued as U.S. Pat. No. 9,798,688 and entitled BUS ARBITRATION WITH ROUTING AND FAILOVER MECHANISM, which claims the benefit of and priority to U.S. Provisional Application 61/789,644, filed 15 Mar. 2013. U.S. Provisional Application 61/789,644 and U.S. application Ser. No. 14/216,627 are hereby fully incorporated herein by reference.

FIELD

Embodiments of the invention relate generally to a reliability technique using bus re-routing and failover mechanism in a bus system particularly comprising a plurality of bus masters and slave devices connected using a common bus.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

It is widely recognized that as the computer system networks continue to grow, so also do the demands for performance, adaptability, reliability and high availability. A conventional computer system has the ability to support fully redundant architecture and failover.

Common implementation of a redundant architecture and failover mechanism is applied in a system level architecture of computer systems, where redundant components are usually managed by software that provides fault detection and correction procedures to maximize availability of the critical services and application provided by that system. An example of a system level implementation of redundant architecture is in an IP network that provides failover mechanism when a router fails or when links between hosts and clients fail. In response to this, designers develop several methods and improvements to provide a failover feature. Basically in a network, the failover process involves a brief interruption in services. The failover recognition and failover process are then triggered to initialize the services on a backup server. This process occurs automatically without human intervention.

Board level or chip level architecture also involves the use of Redundant Array of Independent Disks (RAID) and has become a commonplace in serving storage environments. The RAID system is an external device that is usually connected between two or more servers managed by a RAID controller. To ensure reliability with the system, a failover mechanism is implemented.

Mainly, a failover mechanism is a method of how the system operates in a board level or chip level architecture in the event when one or more or of the controllers that manages internal/external devices, mirrored devices or other memory devices fails in a system implemented on applied specific integrated circuits (ASIC).

One example of a failover method is described, for example, in U.S. Pat. No. 6,578,158 B1 to Dietz et al. Dietz uses a fibre channel arbitrated loop to provide a failover and fallback mechanism for failed controllers. The method includes disabling the failed controller and instructing the surviving controller to assume the identity of the failed component.

Loops are used to connect a host computer to a controller and the controller to the RAID system. Though the invention is efficient, it is unfortunately limited to certain prospects: (1) the invention focuses on the failure of the RAID controller component and does not address the failure of a loop or path connections (2 the invention is specific to RAID devices, and (3) lastly, it is limited to fibre channel loops.

Moreover, U.S. Pat. No. 6,681,339 B1 to McKean et al, to circumvent failover, uses a dual-controller mechanism to provide redundancy. First and secondary controllers are coupled to one another so that in the event of a controller failure, the surviving controller will take over the task performed by the failed controller.

Though the above commonly-owned and commonly-assigned patents provide a solution to certain failover problems, they only provide an answer to one certain failure, and that is the failure of a controller component. They do not provide a solution to the case in which a link in the computer system fails. The failure of a component and the failure of a link or path are different.

When a controller component fails in a system, a host or other components attached to it are rendered as unusable unless a redundant path is prepared to redirect all the signals of a certain host to a secondary controller component. These are the scenarios provided in the above patents. On the other hand, when a link or a path fails between a controller component and a storage device, the host or components attached to the controller component are still considered operational. Certain methods can be used to address this scenario. For example, the controller component to which these devices are attached can perform the role of a router and select available paths to allow communication between the host and the storage devices.

The second case of failover is best described using U.S. Pat. No. 5,822,251 to Bruce et al, hereby considered as a reference. In the invention, a controller component is implemented on an application specific integrated circuit (ASIC) wherein a dual flash specific DMA controller is used to control expandable flash memory devices. A connection is achieved using flash bus "buddy lines" to allow the DMA controller to perform flash commands and data transfer between the controller chip and the flash memory module. However, while the patent provides flash bus "buddy lines" as a mechanism for redundancy, it unfortunately it does not consider the probability of a flash bus failure.

Unfortunately, the method is limited to a fibre channel arbitrated loop architecture.

SUMMARY

An embodiment of the present invention features a technique for robustness and availability of a storage system by providing a method of bus routing and failover mechanism to bus arbiters comprising the system. More specifically, an embodiment of the present invention offers a set of techniques for providing failover and routing of long running connections across a distributed collection of bus masters and slave devices that is useful for fault-tolerant and load-balanced distribution of data, control and command signals.

In one embodiment of the invention, a system architecture for bus masters and bus arbiters are provided to support routing and failover. The system comprises large pools of bus masters, a plurality of sets of which can be configured to control a plurality of slave devices; each set contains a collection of bus masters attached to a central arbiter driving one of the system buses. Each set controls a group or groups of slave device that are primarily controlled by the bus master(s) within the set. A system can therefore include a plurality of sets and can control a group of slave devices. In the system, an arbitor not only performs the duty of bus arbitration; but it also serves as the health monitoring device, wherein it constantly monitors the condition of the bus attached to it and is capable of generating a status signal enabling the system to operate in a routing or failover mode. Each arbiter is assigned to a bus and is provided by a bus identification code. To promote flexibility in the system, an arbiter priority selector is provided; when the routing or failover mode is enabled, the selector decides which bus is to be utilized or re-used.

According to one embodiment of the present invention, in the event of a bus failure, the arbiter connected to that failed bus sends a status signal to the arbiter priority select enabling the selection among the surviving buses that the bus masters from the disabled bus can access. The data, commands and control signals of the bus masters from the disabled bus that is allowed to perform a bus transaction in a secondary bus is migrated to the secondary arbiter. This ability can allow bus masters from the disabled bus to continue a bus transaction in the event of a bus failure.

In another embodiment of the present invention, in the event that a bus is idle or left unused due to an inactive bus master, the arbiter connected to the idle bus can accept external request from other arbiters to re-route data, commands and control signals. In the event of long-running bus transaction, a certain arbiter can possibly become congested with bus requests from a plurality of bus masters with which it is connected. Detecting the congestion, the arbiter sends a status signal to the arbiter priority select, enabling the routing mode of the system. In this case, the arbiter priority select chooses among the idle bus(es) that it can use to re-route other requests and bus transactions.

In another embodiment of the invention, a system architecture for bus masters and bus arbiters is provided to support routing and failover. A CPU or an arbiter priority select determines re-routing or failover between buses. Point-to-point flashbus topology may be used to connect the components in the system architecture. The system comprises large pools of bus masters, a plurality of sets of which can be configured to control a plurality of slave devices, wherein each set contains a collection of bus masters attached to a central arbiter driving one of the system buses. Each set controls a or groups of slave device that are primarily controlled by the bus master(s) within the set. A system can, therefore, include a plurality of sets and can control a group of slave devices.

In an embodiment of the invention, an apparatus comprises: a plurality of bus masters and a plurality of bus arbiters to support routing and failover, wherein each bus arbiter is coupled to a plurality of bus masters and a central processing unit (CPU) coupled to at least one of the bus arbiters; wherein the CPU is configured to execute a firmware that chooses bus re-routing or failover in response to a bus failure.

In another embodiment of the invention, a method comprises: choosing, by a central processing unit (CPU) coupled to a plurality of bus arbiters, bus re-routing or failover in response to a bus failure.

In yet another embodiment of the invention, an article of manufacture comprises a non-transient computer-readable medium having stored thereon instructions that permit a method comprising: choosing, by a central processing unit (CPU) coupled to a plurality of bus arbiters, bus re-routing or failover in response to a bus failure.

It is to be understood that both the foregoing general description and the following detailed description are exemplary and explanatory only, and are not restrictive of the invention, as claimed.

The accompanying drawings, which are incorporated in and constitute a part of this specification, illustrate one or several embodiment(s) of the invention and together with the description that serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

In the following description and in the claims, the terms "include" and "comprise" are used in an open-ended fashion, and thus should be interpreted to mean "include, but not limited to. Also, the term "couple" (or "coupled") is intended to mean either an indirect or direct electrical connection (or an indirect or direct optical connection). Accordingly, if one device is coupled to another device, then that connection may be through a direct electrical (or optical) connection, or through an indirect electrical (or optical) connection via other devices and/or other connections.

Figure 1:
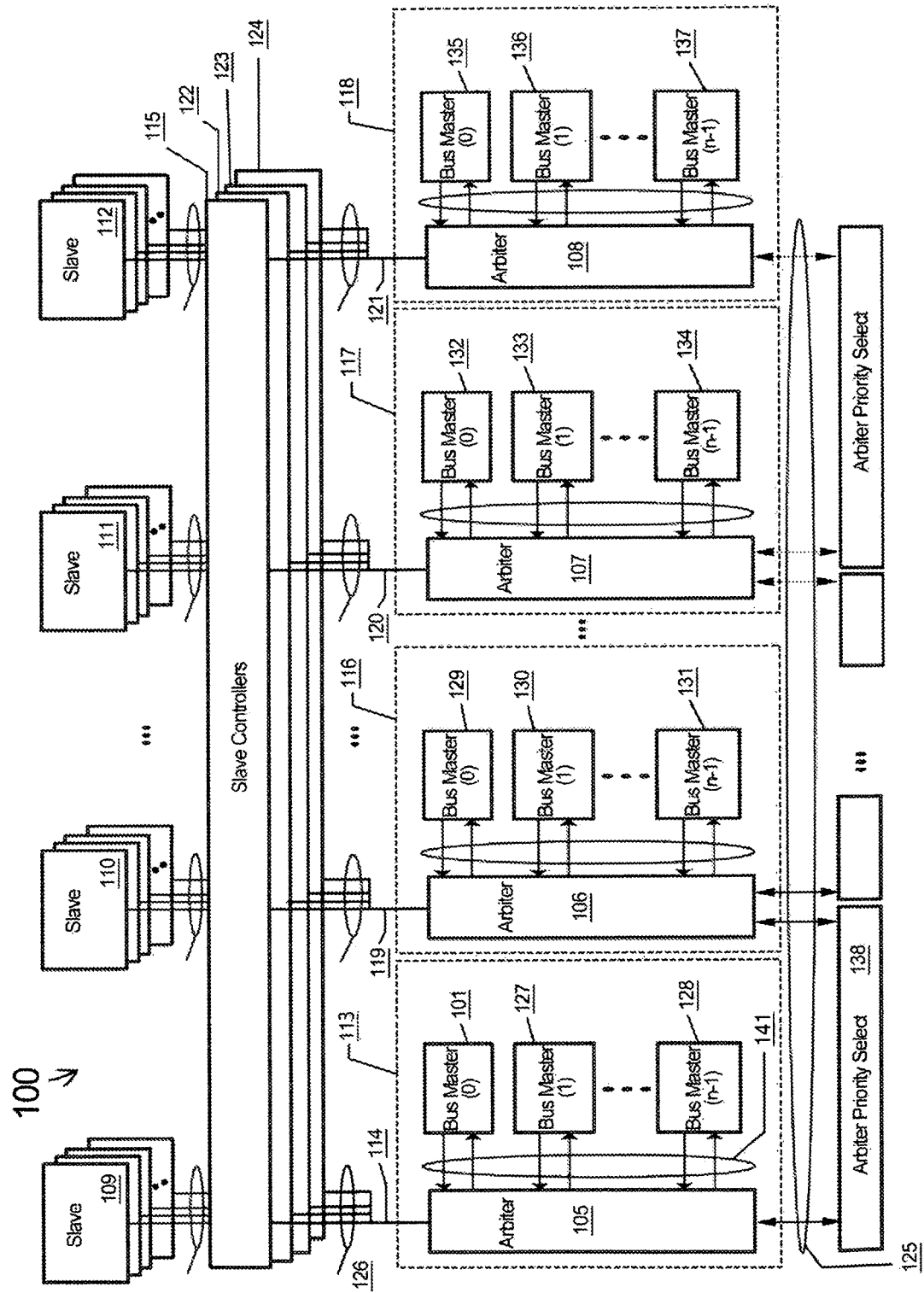
FIG. 1 is a diagram illustrating an embodiment of a system comprising of a plurality of bus masters driving system buses, with bus arbiters, slave controllers and slave devices according to the embodiment of the present invention.

FIG. 1 is a diagram illustrating a system comprising a plurality of bus masters driving system buses, and further comprising bus arbiters, slave controllers and slave devices according to the embodiment of the present invention.

The present invention provides a system 100 with a large pool of bus masters (101, 127, 128, 129, 130, 131, 132, 133, 134, 135, 136 and 137) from which a subset may be selected and configured to form a cluster of bus masters that control a group of slave devices (109, 110, 111 and 112) through system buses (114, 119, 120 and 121). The architecture can be specifically arranged in a progressive expansion wherein a plurality of sets can be formed containing 0 to n−1 number of bus masters. Bus masters 101, 127, 128, 129, 130, 131, 132, 133, 134, 135, 136 and 137 together with their respective arbiters are preferably contained in a single Application Specific Integrated Circuit (ASIC).

As shown in FIG. 1, a set 113 of bus masters (101, 127 and 128) is connected to a plurality of slave devices 109 through a single bus 114. The bus 114 is attached to a slave controller 115 that manages several slave devices 109. Each bus master 101, 127 and 128 within set 113 can access bus 114 through bus arbiter 105. Bus masters 101, 127 and 128 communicate to bus arbiter 105 using control and data lines 141.

Under certain embodiment of the present invention, a plurality of subsets (113, 116, 117 and 118) of the pool of Bus Masters (also referred to herein as "sets") can be formed system 100. For ease of description, system 100 is describe as including but not limited to the following: set 113 comprising bus masters 101, 127 and 138 attached to bus 114 through a single arbiter 105; set 116 comprising bus masters 129, 130 and 131 attached to bus 119 through a single arbiter 106; set 117 comprising bus masters 132, 133 and 134 attached to bus 120 through a single arbiter 107 and set 118 comprising bus masters 135, 136 and 137 attached to bus 121 through a single arbiter 108. The number of components illustrated in FIG. 1 (bus masters, slaves, arbiters, and slave controllers) are just for discussion purposes; the invention is not limited to the numbers depicted.

To support bus routing and failure, an arbiter priority select 138 is provided in system 100. Sets 113, 116, 117 and 118 are attached to arbiter priority select 138 by their respective bus arbiters 105, 106, 107 and 108. Arbiters 105, 106, 107 and 108 use a messaging link 125 to communicate to arbiter priority select 138 in the event of bus routing and bus failure. Messaging link 125 can be, but is not limited to, a control or data signal. The arbiters (105, 106, 107 and 108) in system 100 can communicate with each other using arbitor priority select 138. Arbitor priority select 138 can be implemented with any or, a combination of the following technologies: a state machine, logic circuits(s) having an appropriate combination of logic gates, etc.

Under certain embodiments of the present invention, once configured, arbiter priority select 138 can manage at least two sets (e.g., 113, 116, 117 and 118) in the event of bus re-routing and failover. This will allow a minimum of two arbiters (e.g., 105, 106, 107 and 108) to exchange information when routing and bus failure is performed. For example, in the event that bus 119 fails to perform data transfer from a set 116 of bus masters 129, 130 or 131, arbiter 106 sends information to arbiter priority select 138 that bus 119 is no longer functioning. Arbiter priority select 138 then selects among the available buses (114, 120 or 121) of which it can allow a bus master from set 116 to gain bus access among the surviving buses. Arbiter priority select 138 will send a priority signal through messaging link 125 to the surviving arbiters (e.g., 105, 107 or 108), and a surviving arbitor (105, 107 or 108) selects a bus (114, 120 or 121) that the bus master from set 116 can access. With this configuration, the bus (114, 119, 120 or 121) owned by the sets (113, 116, 117 or 118) can be made into a shared bus.

The present invention is not limited to the event of a bus failure. It also supports a routing and redundancy mechanism for controls and data transfers in cases of unused, idle or inactive buses. In one example, bus master 131 is having a long transaction with bus 119, and at the same time, bus master 129 is requesting access to bus 119 but bus 114 is not busy. Arbiter 106 signals arbiter priority select 138 that it wishes to utilize bus 114. This is an indication to arbiter 105 to accommodate bus master 129's request using message link 125. Arbiter 105 takes over arbiter 106's role in connecting bus master 129 to a slave controller connected to the requested slave.

The slaves 109, 110, 111 and 112 in system 100 can be expanded by adding several slave controllers 122, 123 and 124. FIG. 1 shows an example of how slave controllers 115, 122, 123 and 124 are attached to the bus 114, 119, 120, and 121. Bus 126 is a distributed version of bus 114 wherein the arbiter 105 is connected to the slave controllers 115, 122, 123, and 124. Same implementation is applied for the rest of the arbiters 106, 107 and 108 in system 100.

Figure 2:
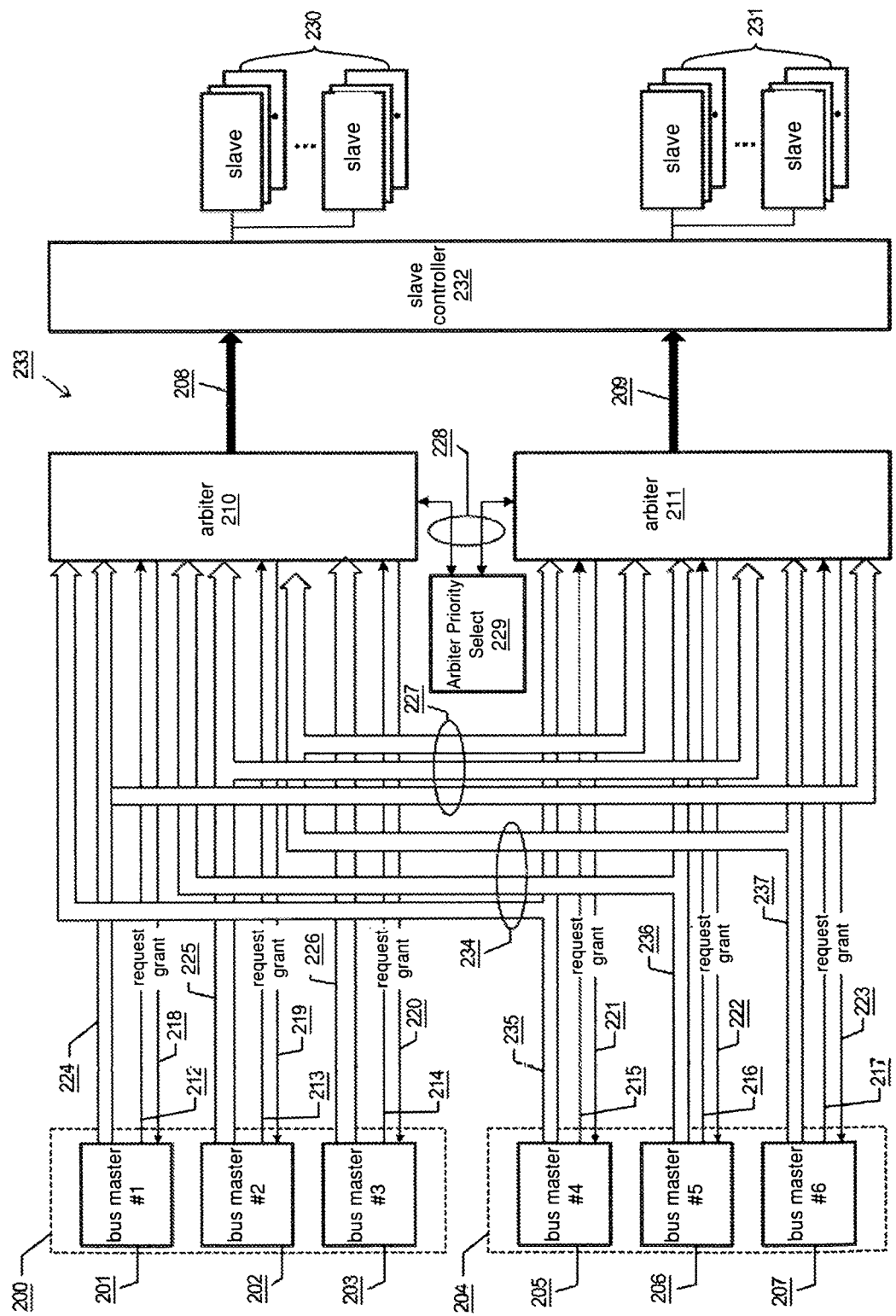
FIG. 2 is a diagram illustrating an example of one embodiment of the present invention.

FIG. 2 is a diagram illustrating an example of one embodiment of the present invention. In a preferred embodiment, system 233 comprising of a plurality of bus masters 201, 202, 203, 205, 206 and 207 is configured to form two sets 200 and 204. Bus masters 201, 202 and 203 are contained in set 200 and attached to a single arbiter 210. The arbiter 210 drives the bus 208, allowing any of the bus masters from set 200 to control slave devices 230. These slave devices are owned by the masters from set 200 and are directly attached to slave controller 232. A secondary set 204 is configured, comprising bus masters 205, 206 and 207. Attached to it is an arbiter 211 which drives bus 209. Slave devices 231 are owned by the bus masters from set 204 and are attached to slave controller 232. The arbiters 210 and 211 are attached to a central arbiter priority select 229.

As was previously mentioned, under the embodiment of the present invention, the number of sets is configurable to contain a plurality of bus masters. In the same manner a preferable configuration is that at least two arbiters are attached to an arbiter priority select 229.

FIG. 2 highlights the interconnectivity of the dual sets (200 and 204) to an arbiter (210 and 211) and a link between arbiters 210 and 211 of each set. The figure also highlights redundant paths established by the bus masters from set 200 and 204 for routing and failover support. For the purpose of this discussion, two groups of slaves are also included.

Slave devices 230 are owned by the bus masters from set 200. In light of this, slaves 230 can receive data, command and control signals from any of the bus masters from set 200 that is in control of the bus 208. With the same implementation as mentioned above, slaves 231 are owned by the bus masters from set 204. Therefore slaves 231 can receive data, command and control signals from any of the bus masters from set 204 that is in control of the bus 209. The slave controller 232 is directly connected to buses 208 and 209, and receives and translates any command and control signals from the bus masters of sets 200 and 204 into slave specific commands and control signals.

As shown in the figure, a plurality of bus masters in set 200 and set 204 may be interconnected to a common unitary bus 208 and 209 via bus arbiters 210 and 211 respectively. Requests 212, 213 and 214 represent bus arbitration request signals from bus masters 201, 202 and 203 respectively. In the same manner, requests 215, 216 and 217 represent bus arbitration request signals from bus masters 205, 206 and 207. The arbitration request signal indicates the type of transaction the bus masters wants to perform. The transaction can either be a data bus transfer or command/control bus transfer. Bus arbiters 210 and 211 perform multi-level priority arbitration among bus masters from sets 200 and 204. Grants 218, 219 and 220 are bus grant signals from arbiter 210 to bus masters 201, 202 and 203 respectively, indicating that the bus master can access bus 208. Only one bus master from set 200 can access the bus 208 at a time. Similarly, arbiter 211 outputs grants 221, 222 and 223 as bus grant signals for bus masters 205, 206 and 207 respectively, indicating that the bus master can access the bus 209. Only one bus master from 204 can access the bus 209 at a time.

Request signals from the bus masters of set 200 and set 204 are solely for their corresponding arbiters; 210 and 211 respectively. Request signals from set 200 are dedicated to arbiter 210 while request signals from block 204 are dedicated for arbiter 211.

Unlike the request and grant signals, data and controls/command paths are distributed among the arbiters (arbitors 210 and 211). Data and control paths 224, 225 and 226 are the primary/default paths for data and control/command signals from bus masters 201, 202 and 203 respectively. This primary/default path for the bus masters from set 200 is connected to arbiter 210 and is used during bus transaction when any of the bus masters from set 200 sends data, commands and controls to slaves 230 via bus 208. Aside from the primary/default path that bus masters from set 200 establish with arbiter 210, a secondary path is also established by these bus masters to arbiter 211. The paths 227 connect bus masters 201, 202 and 203 to arbiter 211. This connection is a secondary/alternative path for data and control signals of the bus masters in set 200 in the event that bus 208 fails to function or when arbiter 210 performs re-routing.

The corresponding set-up is analogous to the operation of bus masters in block 204 wherein the data and controls paths include a primary/default path (235, 236 and 237) and a secondary/alternative path 234. These paths are utilized both for routing and failover mechanism. With the secondary paths 234 and 227, performance and reliability is enhanced. Bus masters from sets 200 and 204 can perform a bus transaction to bus 208 and 209, providing a fault tolerant bus transaction.

During a process of arbitration in the event of re-routing and failover, arbitors 210 and 211 communicate. Messaging-link 228 between arbitors 210 and 211 is established through the presence of arbiter priority select 229. This messaging link 228 can be, but is not limited to, a custom messaging exchange protocol, control signals, etc. Signals comprising the messaging link 228 are used by the arbiter priority select to monitor the health of buses (208 and 209).

In the event of re-routing and failover, coupled with the data, command and control signals, bus masters from each of sets 200 and 204 transmit a bus identification code. This identification code represents the bus to which a destined slave is located. For example, bus 209 fails to function, and a bus master from set 204 is allowed to access the bus 208. Knowing that set 204 uses path 234 as a secondary path and does not directly own but utilizes bus 208 only due to failure of its own bus (bus 209), a bus master from set 204 sends a bus identification code indicating that the data, command and control signal it transmits via bus 208 is intended for slave devices 231 and not for slave devices 230. The bus identification code is received by slave controller 232 and used to select the appropriate slave destination.

Figure 3:
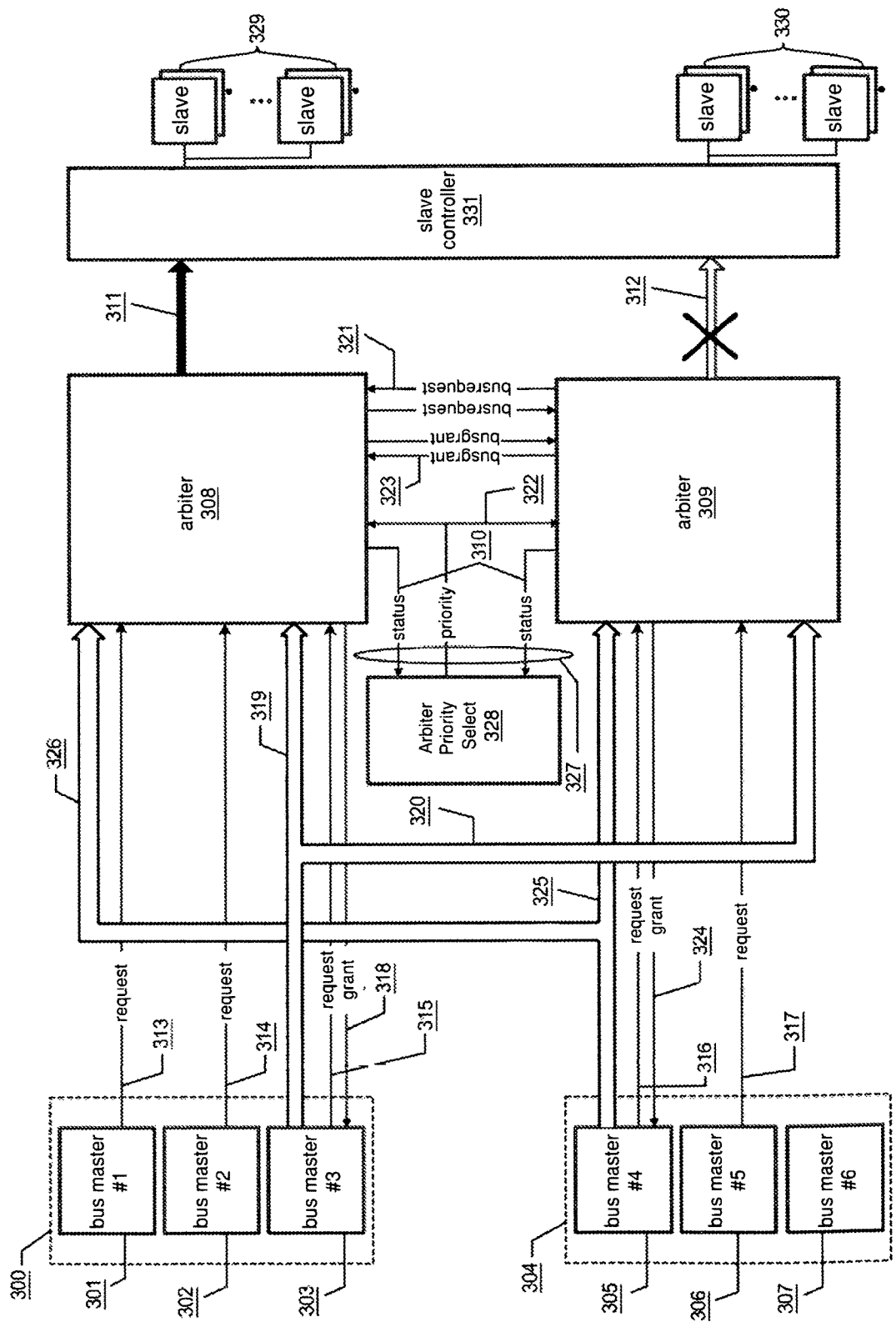
FIG. 3 is a diagram illustrating an example of a system including a failover mechanism that functions in the event of a bus failure, according to the embodiment of the present invention.

FIG. 3 is a diagram illustrating an example of a system operating in the event of a bus failure where a failover mechanism functions according to the embodiment of the present invention.

With the architecture and configuration in system 233, the process of failover mechanism is described wherein: bus masters 301, 302 and 303 from set 300 are actively participating in bus arbitration to transfer data to slave devices 330. Additionally, bus masters 305 and 306 from set 304 are actively participating in bus arbitration to transfer data to slave devices 331 and bus 312 is detected as malfunctioning.

Arbiter 308 receives request signals 313, 314 and 315 from the bus masters 301, 302 and 303; concurrently, it sends a status signal to arbiter priority select 328 relating to the health of bus 311. This status signal 310 informs arbiter priority select 328 whether the bus 311 is currently functioning or damaged. For this example, bus 311 is in good condition, indicating that the arbiter 308 can grant a bus master from set 300 with the highest priority of bus access and allow transfer of data, command and control signals to slave devices 329.

At this moment in time, arbiter 309 is receiving request signals 316 and 317 from bus masters 305 and 306 respectively from set 304 requesting bus access in bus 312. Bus master 307 is shown as not participating in the bus arbitration. Detecting that bus 312 is not functioning, arbiter 309 sends a status signal 310 to arbiter priority select 328 of relating to the health of bus 312 indicating that bus 312 can not perform data transfer.

With the failover mechanism taking place, arbiter 309 still performs arbitration among bus masters 305 and 306. In the event where the arbiter 309 has selected a bus master with the highest priority, arbitor 309 sends a busrequest signal 321 to arbiter 308. The busrequest signal is an indication to arbiter 308 that a bus master with highest priority from set 304 is requesting to use bus 311. At the same time, arbiter 308 has selected a bus master with a highest priority from set 300. With two bus masters determined as high priority, arbiter 308 is handling two high priority requests for bus 311, and one of the requests is from set 300 while the other is from set 304.

In an embodiment of the present invention, one of the major functions of the arbiter priority select 308 is to choose which high priority request from each set will be serviced first. For this example, since bus 311 is in good condition and it is primarily owned by set 300, a bus master with the highest priority from set 300 will be selected first. Therefore the priority signal 322 of the arbiter priority select will point to arbiter 308, granting the bus master from set 300. Arbiter 308 sends a grant signal 318 to the winning bus master 303. Upon receiving the grant signal 318, bus master 303 starts to transfer command, control and data information to the target slave device 329 using the primary path 319. Path 320 is disregarded.

On completing the bus transaction, the priority signal 322 which previously pointed to arbiter 308 will point to the busrequest signal 321 from arbiter 309, granting the bus master with the highest priority from set 304. Arbiter 308 will send a busgrant signal 323 indicating that it accepts the requests and will administer the data transfer from set 304. Bus master 305, being the highest priority from set 304, receives a grant signal 324 from arbiter 309. This grant signal 324 is just a reflected busgrant signal 323 from arbiter 308. Bus master 305 then uses the secondary path 326 to transmit command, control and data information to slave device 330 via bus 311. The priority select signal 322 will then shift its priority after a bus transaction has completed.

In an embodiment of the present invention, should there be a plurality of sets connected to the arbiter priority select 328 via the arbiters, the priority signal 322 will point to the bus arbiter that can readily service the busrequest signal 321 from the other sets.

In an embodiment of the present invention, the bus identification code is sent together with the control signals indicating the exact bus location of the target slave device. In this example, the bus identification code sent by bus master 305 (from set 304) is directed to the exact location of the slave device 330.

The slave controller 331 receiving this bus identification code from bus 311 determines that the command, control and data information is intended for at least one slave device of slave devices 330 and not for slave device(s) 329. Using a certain algorithm, slave controller 331 converts the received command, control and data signals from the arbiter 308 to slave specific commands and controls that will allow it to manage the targeted slave device 330.

Figure 4:
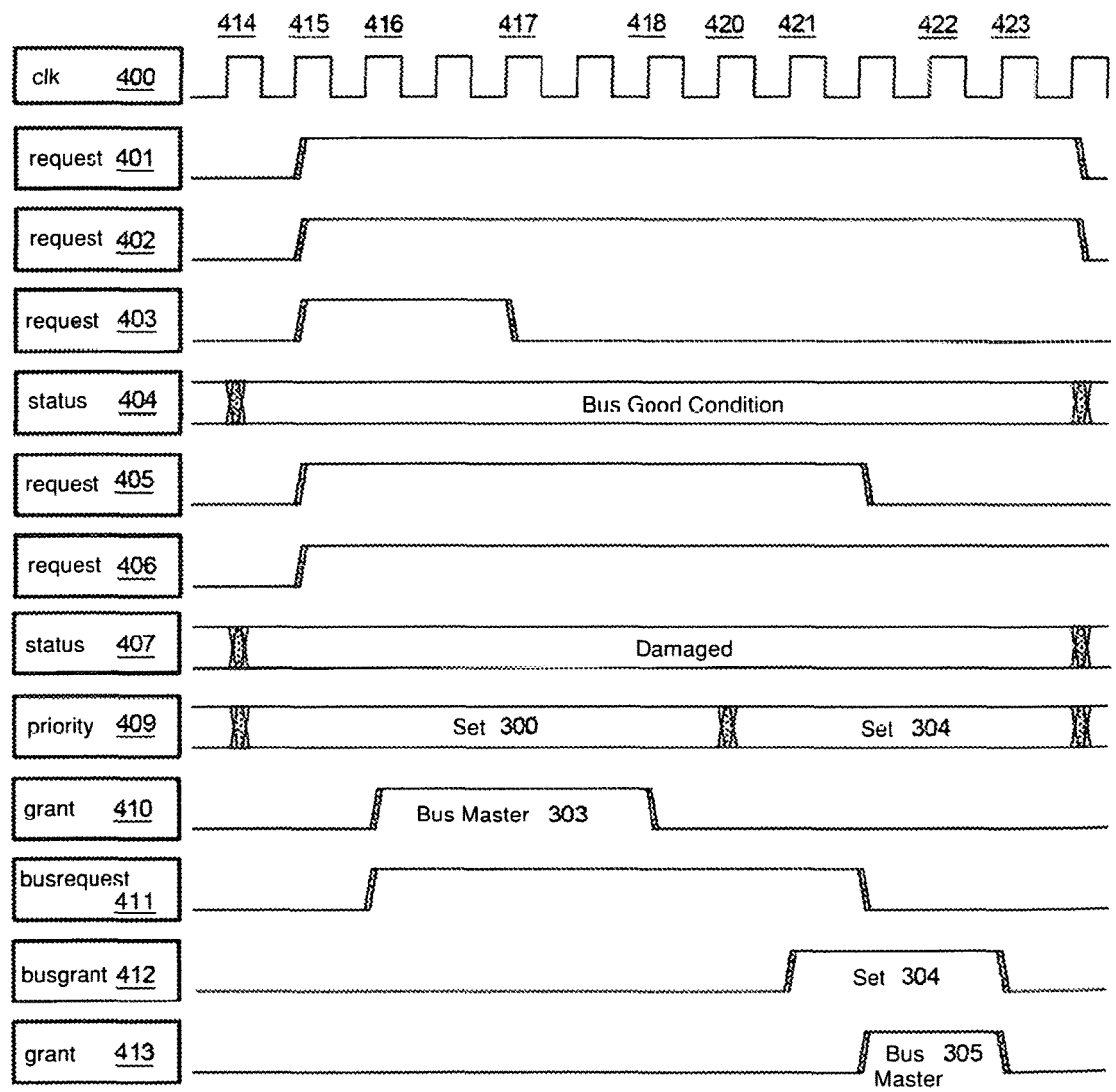
FIG. 4 is a timing diagram illustrating the operation of the system in FIG. 3.

FIG. 4 is a timing diagram illustrating the operation of the system of FIG. 3. Referring to FIGS. 3 and 4, all signals operate in synchronization with the rising edge of a clock signal clk 401 and are active high.

From set 300 of FIG. 3:

Request 401 represents the bus request signal 313 of bus master 301. Here, a data transfer is to be performed, using bus 311, from bus master 301 to a slave device of slave devices 329. Request 402 represents the bus request signal 314 of bus master 302. Here, a data transfer is to be performed, using bus 311, from bus master 302 to a slave device of slave devices 329. Request 403 represents the bus request signal 315 of bus master 303. Here, a data transfer is to be performed, using the bus from bus master 303 to a slave device of the slaves 329.

Status 404 represents the status signal 310 of arbiter 308 to arbiter priority select 328. Here, the status denotes that the bus 311 driven by arbiter 308 is in good condition.

From set 304 of FIG. 3:

Request 405 represents the bus request signal 316 of bus master 305. Here, a data transfer is to be performed, using bus 312 from bus master 305 to a slave device of slave devices 330. Request 406 represents the bus request signal 317 of the bus master 306. Here, a data transfer is to be performed using the bus from bus master 306 to a slave device of the slaves 330.

Status 407 represents the status signal 310 of arbiter 309 to arbiter priority select 328. Here, the status denotes that the bus 312 driven by the arbiter 309 is damaged or unable to perform data transfer.

The priority 409 shown in the timing diagram of FIG. 4 represents the priority signal 310 of arbiter priority select 328 as input to the arbiters 308 and 309. Here, a prioritization between two sets (300 and 304) is being performed. In the event of a bus failure, the arbiter of the surviving bus will allow only one bus master from each set to access it. In this case, priority 409 selects between set 300 and 403. It is assumed that, at clock signal 414 of clk 400, the priority signal 409 points to set 300.

Grant 410 and grant 413 represent bus grant signals 318 and 324 (FIG. 3) that are output to bus masters 303 and 305 by arbiters 308 and 309 respectively.

Busrequest 411 represents the busrequest signal 321 arbiter 309, indicating that it is requesting to access bus 311 due to its failed bus 312. The busgrant 412 signal represents the busgrant signal 323 of arbiter 308 to arbiter 309 indicating that it allows the bus master from set 304 to utilize bus 311.

It is assumed that, in set 300, bus master 303 has the highest priority among the other two bus masters in set 304, it is assumed that the priority of the bus master 305 is higher than
that of the bus master 306.

At clock signal 414 of clk 400, arbiter 309 detects that the bus 312 is damaged and sends a "damaged" status to arbiter priority select 328. Bus 311 remains in good condition, causing the arbiter 308 to send "bus good condition" status to arbiter priority select 320.

Each of bus masters 301, 302 and 303 is requesting the same bus 311. The request signal is triggered at clock signal 415 of clk 400. Similarly, bus master 305 and 306 asserted their request for bus 312 at clock signal 415 of clk 400.

At clock signal clk 400, number 416, the priority of bus master 303 is the highest among the other two bus masters from set 300 and the bus requested by bus master 303 (bus 311) is in good condition. Thus, arbiter 308 outputs a bus grant signal (grant 410) corresponding to priority 409 ("set 300") of
arbiter priority select 328.

In one embodiment of the present invention, the request signal 403 de-asserts at clock signal clk 400 number 417 after receiving grant 410. Note that grant 410 de-asserts at clock signal clk 400 number 418; here, it indicates that the bus transaction or the data transfer executed by the bus master 303 is completed. Improvement was made when the priority signal 322 from arbiter priority select 328 (represented by priority 409) shifts its prioritization at clock signal clk 400 number 420 (after the bus transaction is completed). This will allow the bus master 303 to continuously perform data transfer without interruption from an external high priority request.

Concurrently, at clock signal clk 400, number 416, arbiter 309 has awarded bus master 305 the highest priority to access bus 312; however, bus 312 is inaccessible. In lieu of this event, arbiter 309 asserts a bus request signal (busrequest 411) to arbiter 308, redirecting the request to bus 311 through arbiter 308.

Notice that, at the time the busrequest 411 is asserted, the priority 409 transmitted by arbiter priority select 328 point to set 300. This indicates that the bus transaction (data transfer) conducted by bus master 303 of set 300 is not yet completed and the priority of the operation remains to set 300.

At clock signal clk 400 number 421, the bus master 303 has completed its bus transaction. Arbiter 308 detected a change in the priority signal priority 409 that shifted from set 300 to set 304. At the same time, it is also receiving a bus request signal busrequest 411.

In response to the busrequest 411 sent by arbiter 309, and with the priority signal priority 409 pointing to set 304, arbiter 308 grants the request by sending a bus grant signal, busgrant 412.

Upon receiving bus grant signal busgrant 412, arbiter 309 reflects the grant signal grant 413 at clock signal clk 400 number 422 to the selected bus master from set 304 with the highest priority, which is bus master 305.

It is assumed that at clock signal clk 400 number 423, the data transfer of bus master 305 from set 304 using bus 311 has completed, resulting a shift in priority.

Figure 5A:
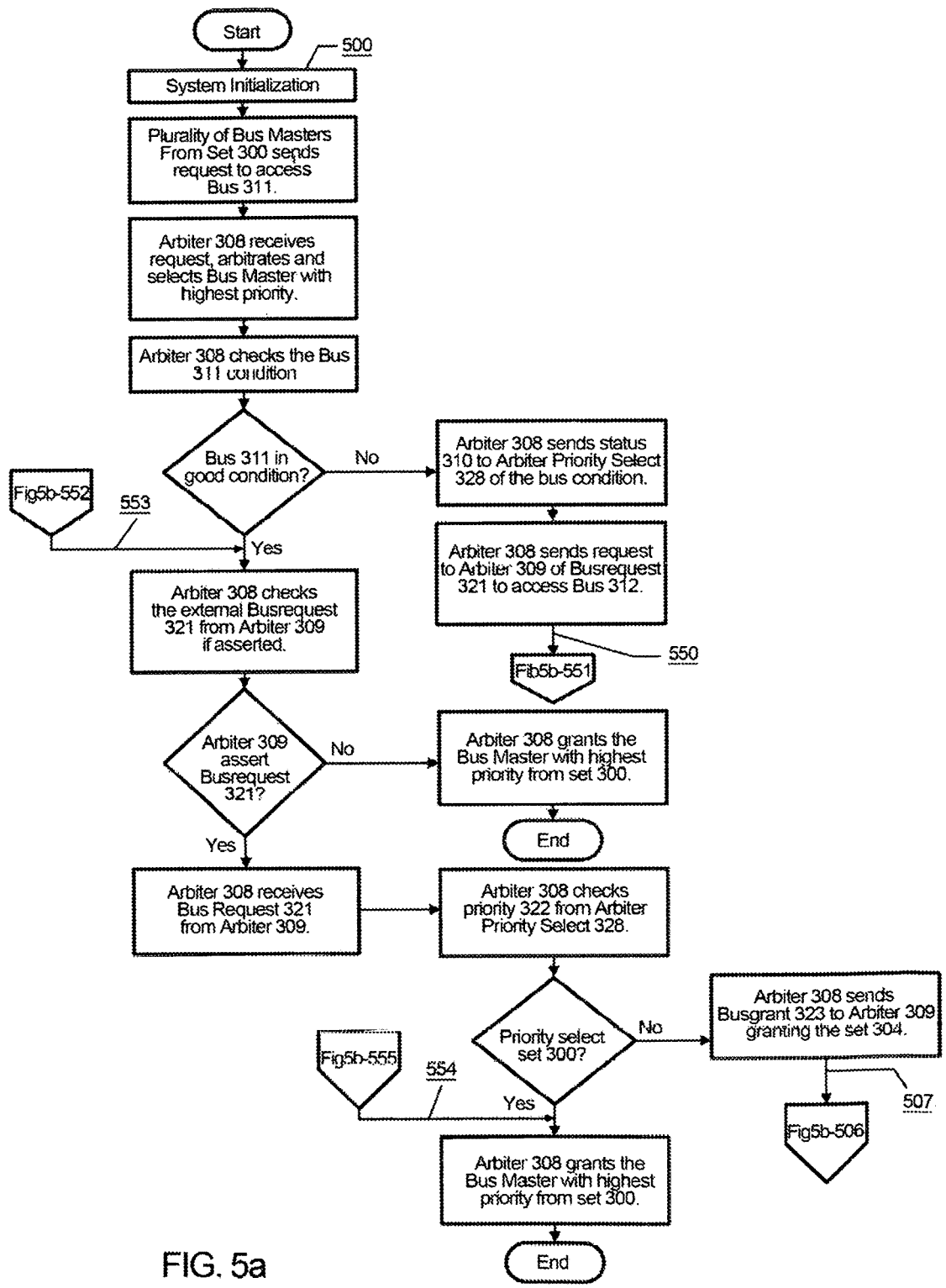
FIGS. 5*a* and 5*b* are flowcharts showing an embodiment of a method performed in the event of a bus failure shown in FIG. 3, according to the embodiment of the present invention.
Figure 5B:
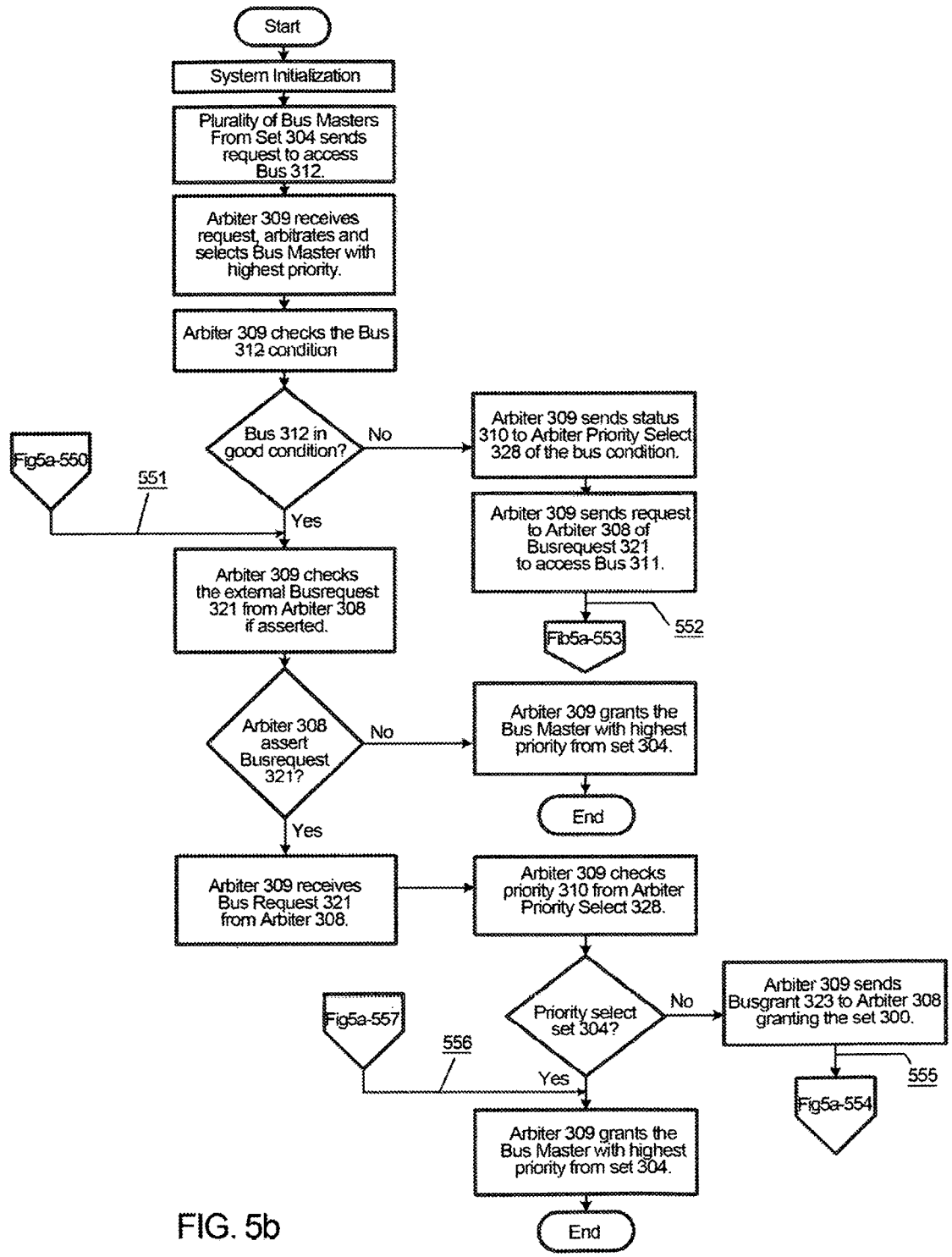

FIGS. 5*a* and 5*b* are flowcharts showing an embodiment of the method performed in the event of a bus failure shown in FIG. 3, according to the embodiment of the present invention. FIG. 5*a* depicts the actions or steps required by arbiter 308 for a failover operation. FIG. 5*b* depicts the actions or steps required by arbiter 309 for a failover operation. Since both arbiters operate in similar steps and for ease of discussion, in reference to FIG. 3, FIG. 5*a* is the focus of this discussion.

First, in system initialization step 500, selection and configuration of set 300 is made. Set 300, which is attached to arbiter 308, which drives buses 311, is configured to form a cluster and is attached to a central arbiter priority select 328 with set 304 operating through arbiter 309. Bus 311 is provided with a unique bus identifier that is communicated to the arbiter priority select arbiter 308, which simultaneously sends a status signal 310 to the arbiter priority select 328 indicating the health of bus 311. For the example shown in FIG. 3, bus 311 is in good condition.

FIG. 5A is a start of the regular operation of the arbitration for bus access of set 300. Generally, such operation involves the request of bus masters 301, 302, and 303 to access bus 311. Bus masters send their request signals 313, 314 and 315 respectively to arbitrate for bus ownership.

FIG. 5A involves the process of a conventional bus arbitration wherein the arbiter 308 selects the bus master with the highest priority. Upon selecting a bus maser with the highest priority, the arbiter 308 checks the bus condition 311. In FIG. 5A, the tracking of the health of the bus is done by checking the status signal 310.

In reference to the operation in FIG. 3, the bus 311 is in good condition. In a next step (following the Yes arrow), arbiter 308 checks the busrequest signal 321. The busrequest signal 321 is an external request coming from another member of the cluster (another set connected to arbiter priority select 328). In the example shown in FIG. 3, busrequest 321 indicates that arbiter 309 wishes to access bus 311. In step 5*xx*, after confirming that a busrequest 321 is asserted by arbiter 309, arbiter 308 checks the priority signal 322 transmitted by the arbiter priority select 328.

FIG. 5A involves the granting of bus 311 access to the bus master from set 300. This resulted to the fact that the priority select signal 322 is pointed towards set 300 through arbiter 308, indicating that the arbiter priority select 328 has awarded set 300 priority for the ownership of bus 311. Arbiter 308 sends a grant signal 318 to bus master 303, allowing bus master 303 to perform a bus transaction in bus 311.

In the event that the priority signal is not pointing to set 300 but to set 304, arbiter 308 sends a busgrant signal 323 to arbiter 309 allowing the bus master selected by arbiter 309 from set 304 to access bus 311.

FIG. 5*b* is discussed in accordance to the operation of the arbiter 309 shown in FIG. 3 driving a damaged bus 312.

First, in system initialization, selection and configuration of set 304 is made. Set 304, which is attached to arbiter 309 that drives bus 312, is configured to form a cluster and is attached to a central arbiter priority select 328 with set 300 through arbiter 308. Bus 312 is provided with a unique bus identifier that is communicated to arbiter priority select 328. Detection of bus failure is essential in this step; arbiter 309 simultaneously sends a status signal 310 to arbiter priority select 328 indicating the health of bus 312. For the example shown in FIG. 3, bus 312 is detected as a damaged bus.

A start is made of the regular operation of the arbitration for bus access in set 304. Generally, such operation involves the request of bus masters 305, 306, and 307 to gain ownership of bus 312. In FIG. 3, bus master 307 is not participating in the arbitration. Active bus masters 305 and 306 send their request signals 316 and 317 respectively to arbitrate for bus ownership.

FIG. 5B involves the process of a conventional bus arbitration, wherein the arbiter 309 selects the bus master with the highest priority. Upon selecting a bus master with the highest priority, the arbiter 309 checks the bus condition (step 5xx). In FIG. 5B, the tracking of the health of the bus is done by checking the status signal 310.

In reference to the operation in FIG. 3, bus 312 is inaccessible, which gives the idea that bus 312 fails to function. This leads to a step wherein arbiter 309 sends a status signal 310 to arbiter priority select 328 that bus 312 cannot be used. The asserting of this status signal 310 enables arbiter priority select 328 to transmit a priority signal 322 that selects between two sets (set 300 and set 304), selecting one set at a time to access the surviving bus 311.

In FIG. 5b, arbiter 309 sends a busrequest signal 321 to arbiter 308 that it would like to access bus 311. The next action to take place is in FIG. 5a wherein, in step 5xx, arbiter 308 detects an external busrequest 321 from arbiter 309.

From FIG. 5a, arbiter 308 grants the request of arbiter 309 by sending busgrant 323, due to the shift of priority from set 300 to 304. Note that the change of priority takes place after the bus transaction of bus master 303 from set 300 is completed. FIG. 5b involves the process wherein arbiter 309 receives the bugrant 323 from arbiter 308. Arbiter 309 reflects this grant signal to the bus master with the highest priority from set 304, which is bus master 305, by sending a grant signal 324.

Figure 6:
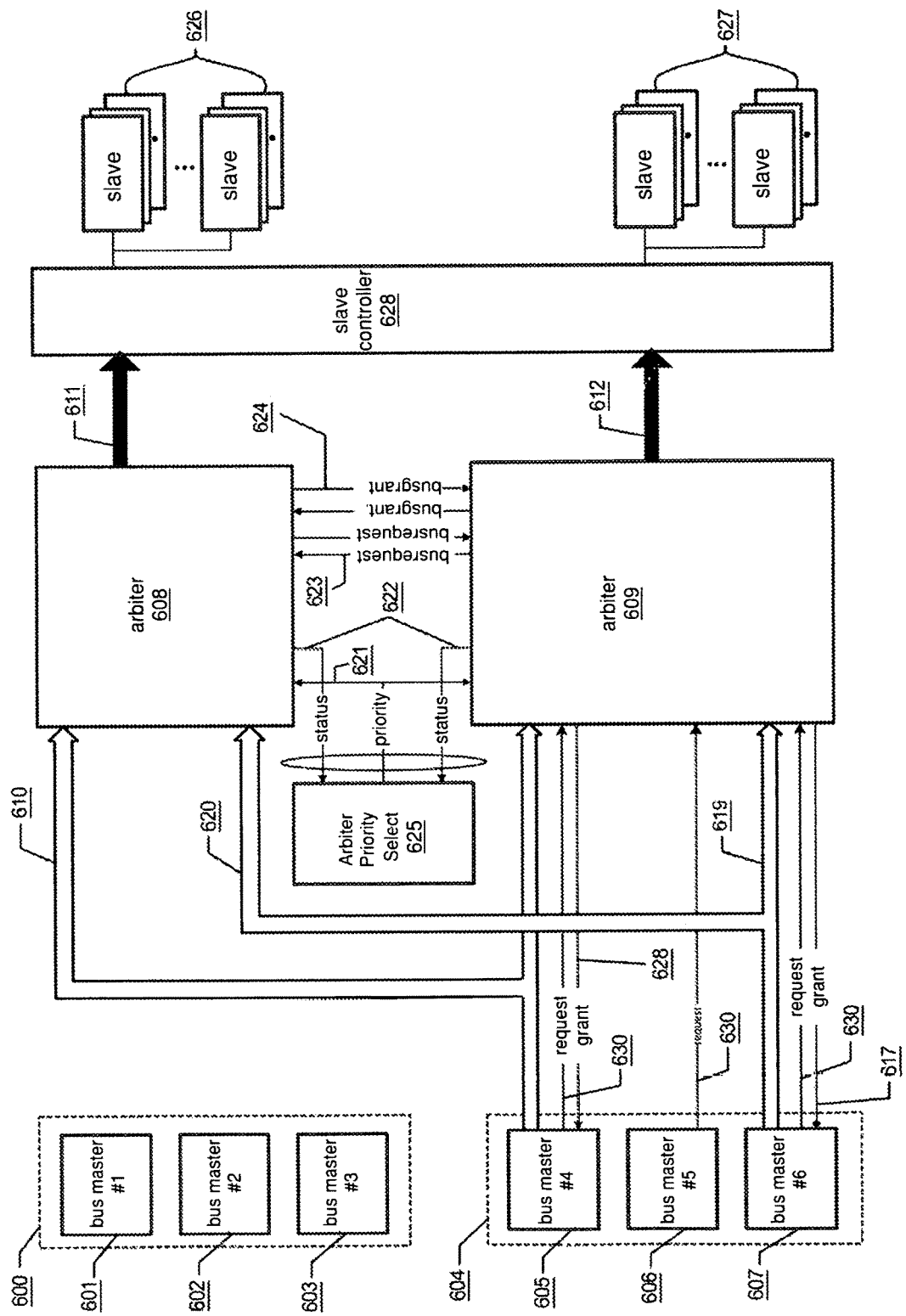
FIG. 6 is a diagram illustrating an example of a system performing bus re-routing according to the embodiment of the present invention.

FIG. 6 is a diagram illustrating an example of a system performing bus re-routing according to the embodiment of the present invention.

The bus re-routing scenario of the invention is similar to the algorithm of the failover mechanism except that the busses involved in system 233 are all functioning and the bus(es) that are free of any transaction will be utilized by other requesting bus masters.

In the light of this discussion, the system 233 in FIG. 2 is adapted, together with its selection of sets and configuration wherein: a set 600 of bus masters (601, 602 and 603) are attached to an arbiter 608, that drives bus 611; a second set 604 of bus masters (605, 606 and 607) is attached to a second arbiter 609 that drives bus 612; sets 600 and 604 are attached to a central arbiter priority select 625 through the arbiters 608 and 609; no detection of bus failure is made in either bus 611 or bus 612; slaves 626 are owned by the bus masters in set 600 while slaves 627 are owned by the bus masters in set 604.

Shown in the figure are two sets (600 and 604) of bus masters. Bus masters from set 600 are in-active, meaning, none of the bus masters from set 600 are requesting bus 611 access. Meanwhile, bus masters from set 604 are asserting their request 630 signal line, indicating that they are requesting to access bus 612 to transfer data, command and control signals to an intended slave device 627.

With both buses in good condition, arbiters 608 and 609 send status information to arbiter priority select 625 regarding the health of the buses 611 and 612 respectively, using status signal 621.

In one embodiment of the present invention wherein a bus is free due to inactive bus request from bus masters attached to it, the arbiter that grants access to the bus can accept external bus requests from foreign sets of bus masters that are attached to the arbiter priority select. As shown, arbiters 608 and 609 are configured to connect to one arbiter priority select 625. Therefore, arbiter 608, having bus 611 attached to it as a free bus, can accept bus request from arbiter 609 to utilize bus 611.

In the example below, Arbitor 609 receives input from bus masters 605, 606 and 607, and performs an arbitration method that selects the highest priority request among the requesting bus masters from set 604. The first part of arbitration results in arbiter 609 awarding bus master 607 as having the highest priority. Arbiter 609 sends a grant signal 617 to bus master 607, indicating that bus master 607 can now perform data transfer to slave(s) 627 using bus 612. Bus master 607 uses path 619 as its primary data and command/controls path. It should be noted that, with the span of the data transfer of bus master 607, ownership of bus 612 remains with bus master 607 until the bus transaction is complete.

Slave controller 628, which is attached to buses 611 and 612, receives the command and control signals from bus master 607. Slave controller 628 converts the signals received into slave specific commands in order to take control of the intended slave devices. Slave controller 618 reads the bus identification code sent by the bus master 607 and uses these to allow it to direct the slave specific command and control signals, together with the data information, to the intended slave destination in slaves 627. Note that the secondary path 620 is disregarded.

While bus master 607 is performing data transfer using bus 612, bus masters 605 and 606 continue to request 630 bus access. Note that, in this example, the bus masters from set 600 remain inactive.

In the event that bus 612 is in the possession of bus master 607 and there are pending requests 630 from bus masters 605 and 606, arbiter 609 sends a busrequest 623 signal to arbiter 608. The busrequest signal 623 is an indication that there are active requests from set 604 that can not be serviced for the moment by bus 612. Arbiter 609 performs a multi-level priority arbitration (hidden arbitration) that selects a second bus master with the highest priority from set 604.

Arbiter priority select 625, receiving a status 622 signal from arbiter 608 that the bus 611 is free, triggers priority signal 621, thereby selecting which set (set 600 or set 604) is to be serviced by bus 611. Note that, if the status signal 622 of the arbiter 608 denotes a "free bus", it automatically indicates that there are active requests from bus masters in set 600.

Arbiter 608, on receiving the busrequest signal 623 from arbiter 609, checks the priority signal 621 from arbiter priority select 625. At this certain point in time, since the status signal 622 received by the arbiter priority select 625 from 608 is a free bus signal, the priority signal 621 will point to the other set requesting access to the bus 611 via arbiter 608. In this case, the priority signal 621 points to set 604.

Arbiter 608 will grant the request from arbiter 609 by sending a busgrant 624 signal. This busgrant 624 signal from arbiter 608 will be reflected to bus master 605 via arbiter 609.

Bus master 605, upon receiving the grant signal 628 from arbiter 609, performs a data transfer to the intended slave of slave devices 627 using path 610. Arbiter 608, having granted the request of bus master 605 via arbiter 609, will process the bus transaction of bus master 605 by sending the data, command and control signals of bus master 605 to the slave controller 628 using bus 611.

Receiving the data, command and control signals includes receiving the bus identification code sent by bus master 605. The identification code specifies the intended destination of the data, command and control information transmitted by bus master 605. Since the information was re-routed due to inactive bus 611, the bus identification code will made it possible for slave controller 628 to identify which slave devices (slave devices 626 or slave devices 627) the information is for. For this example, the bus identification code will denote that the information sent is for the slave devices 627. Note that the specific address of the slave device is also contained in the control signals.

Should there be a case that the bus masters from set 600 are requesting and the busrequest signal 623 from arbiter 609 is asserted, the priority signal 621 will shift its priority from one arbiter to another, allowing only one bus master from each set (set 600 or set 604) to gain access of bus 611 at a time. In the same manner, when the busrequest signal 623 from arbiter 608 is asserted, the priority signal 621 from arbiter priority select 625 will shift from one arbiter to another, allowing only one bus master from each set (set 600 or set 604) to gain access of bus 612 at a time.

Figure 7:
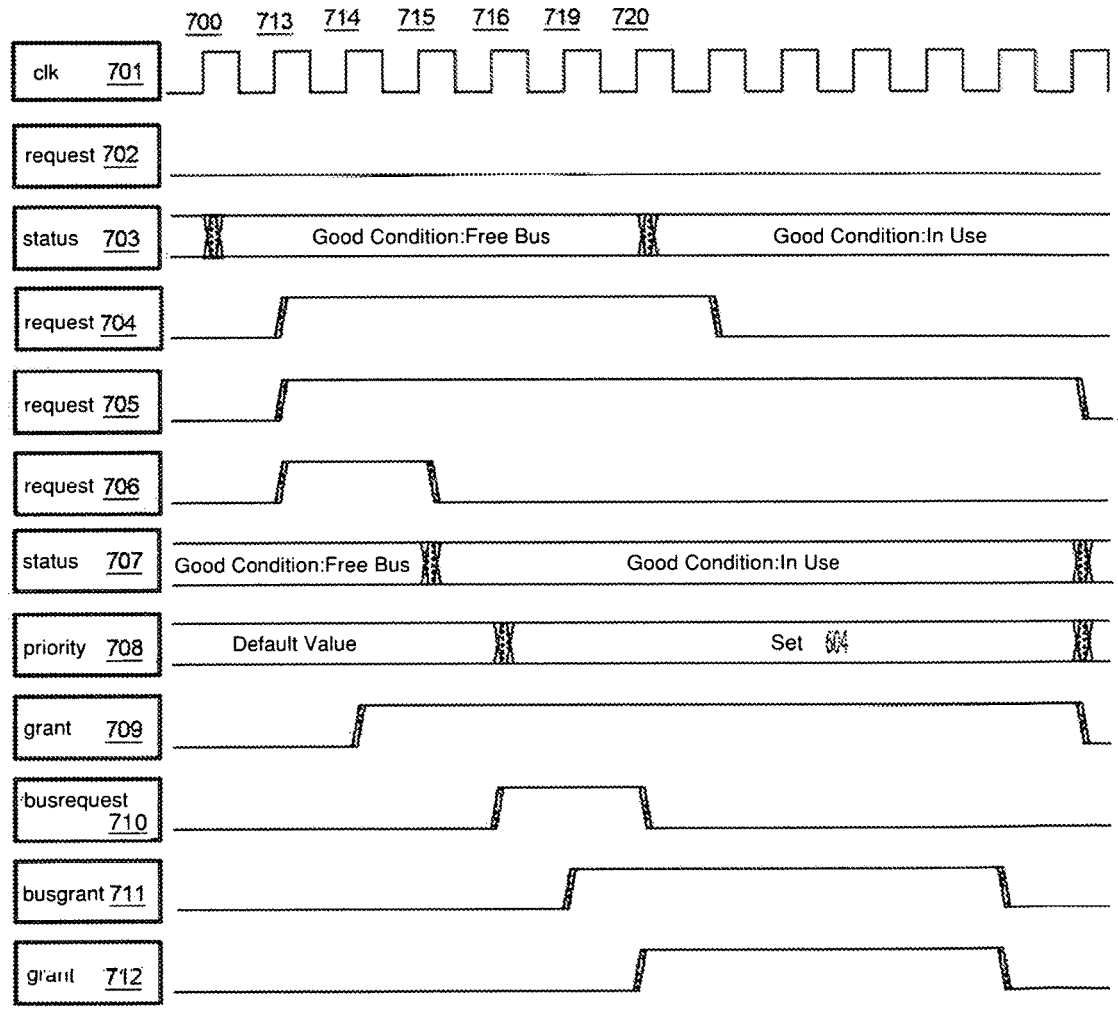
FIG. 7 is a timing diagram illustrating the operation of bus re-routing in FIG. 6.

FIG. 7 is a timing diagram illustrating the operation of bus re-routing of FIG. 6. Referring to FIGS. 6 and 7, all signals operate in synchronization with the rising edge of a clock signal clk 701 and are active high.

From set 600 of FIG. 6:

Request 402 represents the bus request of the bus masters 601, 602 and 603. Here, the request signal 702 is not active due to the fact that none of the bus masters from set 600 wishes to own the bus 611.

Status 703 represents the status signal 622 of the arbiter 608 to the arbiter priority select 625. Here, the status denotes that the bus 611 driven by arbiter 608 is in good condition and is not in use by any bus masters from set 600.

From set 604 of FIG. 6:

Request 704 represents the bus request signal 630 of bus master 605. Here, a data transfer is to be performed, using bus 612, from bus master 605 to a slave device of slaves 627. Request 705 represents the bus request signal 630 of the bus master 606. Here, a data transfer is to be performed, using bus 612, from bus master 606 to a slave device of slaves 627. Request 706 represents the bus request signal 630 of the bus master 607. Here, a data transfer is to be performed, using the bus 612, from bus master 607 to a slave device of slaves 627.

Status 707 represents the status signal 622 of the arbiter 609 to the arbiter priority select 625. Here, the status denotes that the bus 612 driven by the arbiter 609 is in good condition.

Priority 708 represents the priority signal 621 of the arbiter priority select 625 as input to the arbiters 608 and 609. Here, a prioritization between two sets (set 600 and set 604) is being performed. In the event of a bus request re-routing, only one bus master from each set can own the bus.

Grant 709 and grant 712 represent bus grant signals 617 and 628 that are output to bus masters 607 and 605 respectively by the arbiter 609.

Busrequest 710 represents the busrequest signal 624 of the arbiter 609 indicating that it is requesting to access bus 611 for bus utilization. The busgrant 711 signal represents the busgrant signal 623 of arbiter 608 to arbiter 609, indicating that arbiter 608 allows the bus master from set 604 to utilize bus 611.

It is assumed that, in set 604, bus master 605 has the highest priority among the other two bus masters.

At clock signal clk 701 number 700 arbiter 608 detects that the bus 611 that the bus masters from set 600 are not active. With this, the arbiter 608 sends a status signal status 703 to arbiter priority select 625 that the bus 611 is free and not being used. Similarly, arbiter 609 sends a status signal status 707 indicating that the bus 612 is free.

However, at clock signal 713 of clk 701, arbiter 609 receives request signals 704, 705 and 706 from bus masters 605, 606 and 607. Each of the bus masters are requesting the same bus (bus 612).

At clock signal 714 of clk 701, the priority of bus master 607 is the highest among bus master 607 and the other two bus masters from set 604; the bus requested by the bus master is in good condition and free to use. Thus, arbiter 609 outputs a bus grant signal (grant 709). In effect, at clock signal clk 701 number 715, arbiter 609 changes its status signal status 707 to an "in use" bus 612. At the same time, bus master 607 de-asserts the request signal request 704 after receiving the grant signal (grant 709).

At clock signal clk 701 number 716, request signals from set 604 continues to assert, which results in arbiter 609 asserting a bus request signal (busrequest 710) that is sent to arbiter 608 to service. At the time, arbiter priority select 625 detected that the status signal status 707 transmitted by arbiter 609 changed from its default/current value to "in use", such that the priority changes from the current value to set (604). This denotes that, since bus 604 is already in use, and the status signal status 703 of arbiter 608 is "free bus", the priority is directed to the bus masters of set 604 that continuously request for bus access.

With the priority in set (604) and the bus masters continuously requesting to access a bus, arbiter 608 sends a bus grant signal (busgrant 711) to arbiter 609; arbiter 608 will then change its status from "free bus" to "in use bus". Arbiter 609, upon receiving the signal, sends a local grant signal (grant 712) to the bus master with the second highest priority, which in this case is bus master 605.

Figure 8A:
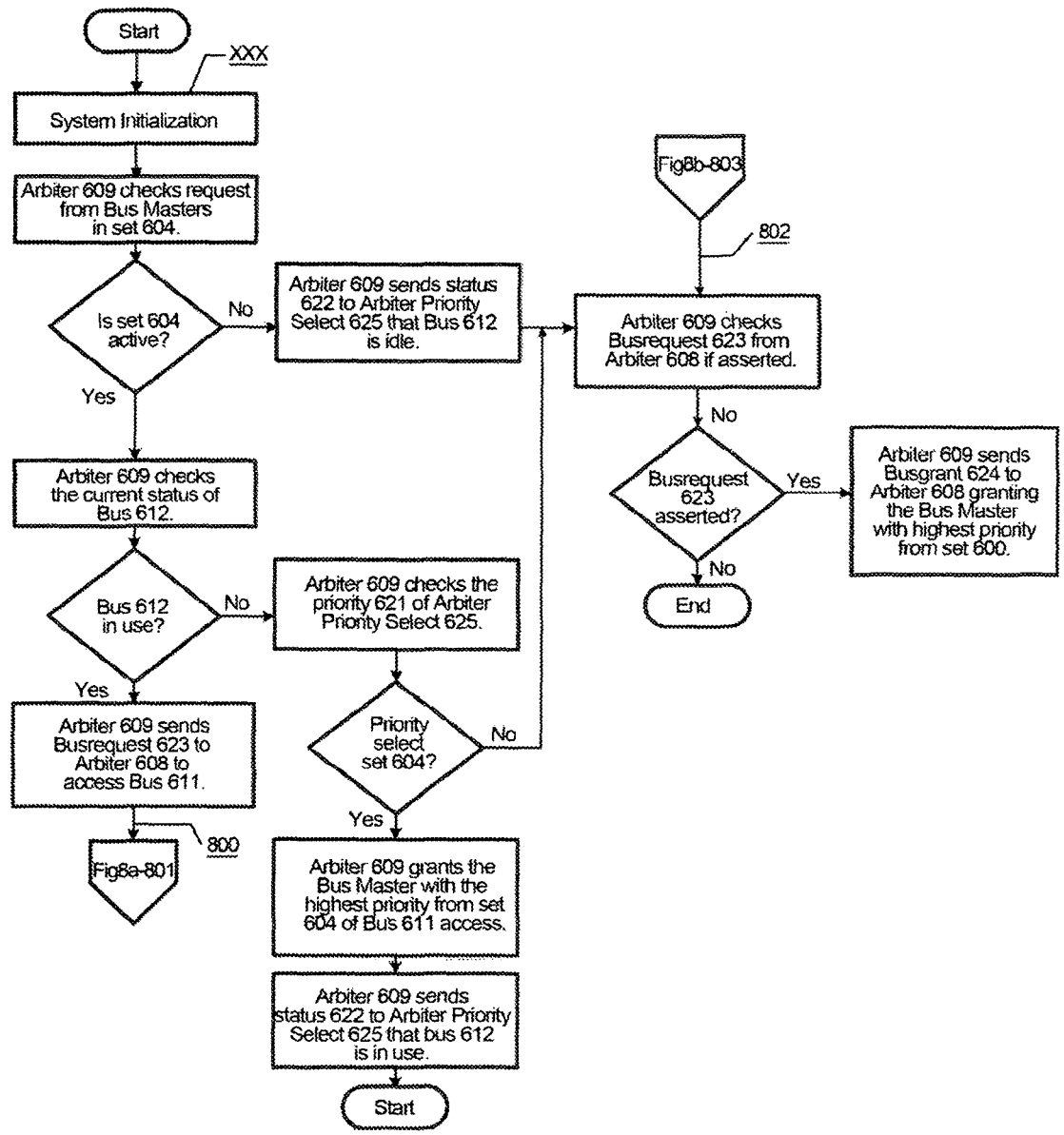
FIGS. 8*a* and 8*b* are flowcharts showing an embodiment of the method performed in the event of bus re-routing shown in FIG. 6, according to the embodiment of the present invention.
Figure 8B:
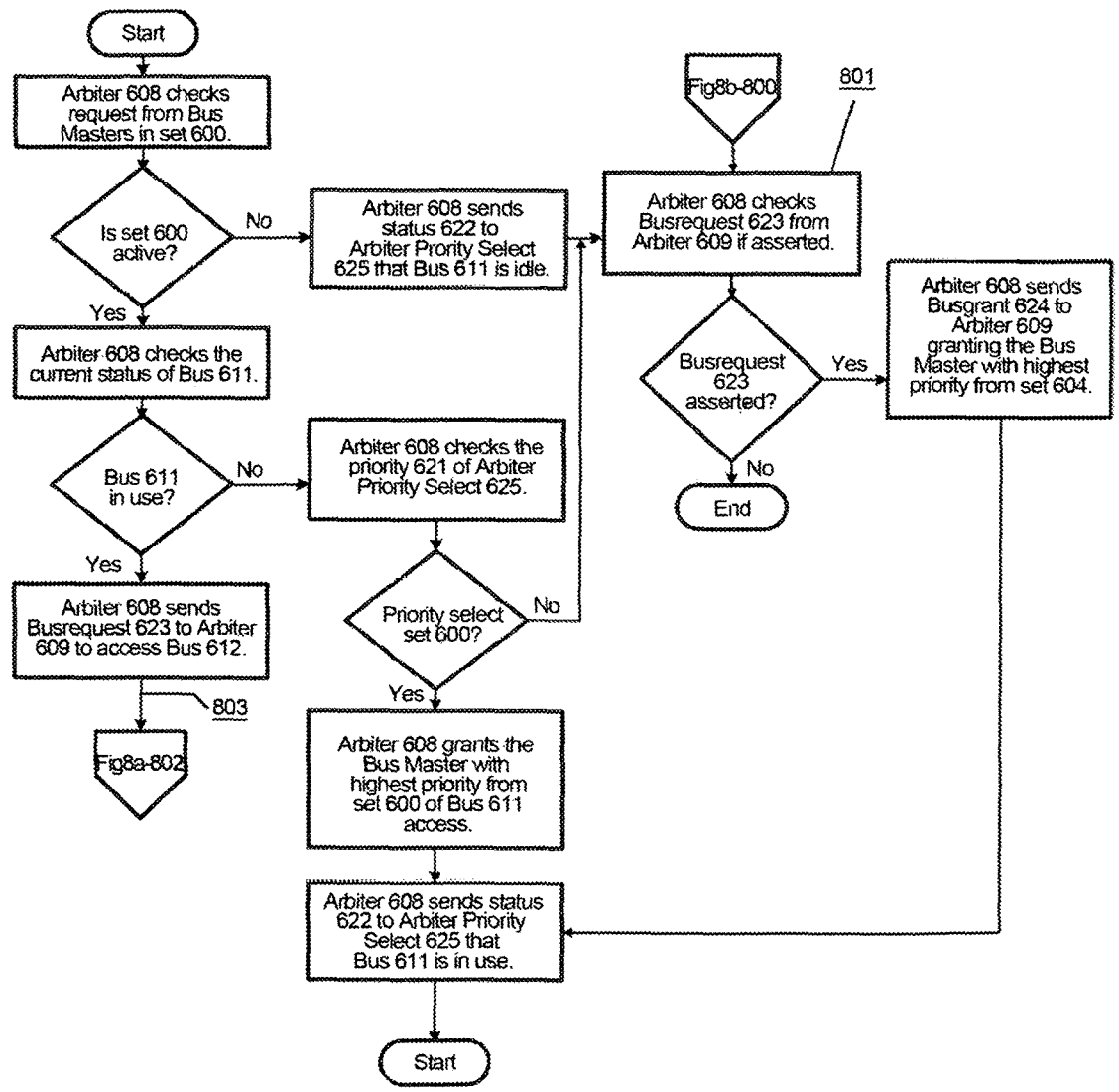

FIGS. 8a and 8b are flowcharts showing an embodiment of the method performed in the event of bus re-routing shown in FIG. 6 according to the embodiment of the present invention.

FIG. 8a depicts the actions or steps required by arbiter 609 to perform a bus re-routing procedure. FIG. 8b depicts the actions or steps required by arbiter 608 to perform bus the re-routing procedure. Since both arbiters operate in similar steps and for ease of discussion, in reference to FIG. 6, FIG. 8a is the focus of this discussion.

First, in system initialization step xxx, selection and configuration of set 604 is made. Set 604, which is attached to arbiter 609 driving bus 612, is configured to form a cluster and is attached to a central arbiter priority select 625, along with set 600, through arbiter 608. Bus 612 is provided with a unique bus identifier that is communicated to the arbiter priority select 625. Detection of bus failure is essential in this step; arbiter 609 simultaneously sends a status signal 622 to the arbiter priority select 625, indicating the health of the bus 612. For the example shown in FIG. 6, bus 311 is in good condition.

FIG. 8a starts the regular operation of the arbitration for bus access by set 604. Generally, such operation involves the launching of bus request from bus masters of set 604. Bus masters 605, 606 and 607 send their request signals 630 to arbitrate for bus ownership. Arbiter 609, before granting any bus master bus access, checks the status signal 622 of bus 612. Based on the example shown in FIG. 6, bus 612 is currently not in use. This leads the arbiter 609 to check the priority signal 621 transmitted by the arbiter priority select 625. It is also assumed that arbiter 609 has awarded bus master 607 the highest priority to access the bus.

In FIG. 6, it is assumed that the default priority of the arbiter priority select 625 points to set 604. This leads to step 8xx, in which the arbiter 609 grants the bus master 605 of bus 612 access.

arbiter 609, on granting the bus master 605, changes its status signal 622 from "free bus" to "in use bus". This signaling denotes that the bus 612 is busy and can not be accessed by any bus master requesting from set 604 or set 600.

Assuming that after a certain time, the operation repeats, but this time, the bus 612 is in use. Once a busy bus is detected, and as the congestion of bus request, bus re-routing is performed.

When the bus 612 is busy, the arbiter 609 sends a bus request signal (busrequest 623) to arbiter 608 to request access to bus 611. From this step, the next procedure occurs in the
operation of arbiter 608 shown in FIG. 8b.

Basing from FIG. 6, arbiter 608 operates in a similar manner as that of the previously discussed operation of arbiter 609 (FIG. 8a). After the step 8xx of initialization, the arbiter 608 checks for any bus request from bus masters of set 600. None of the bus masters are active at the moment, which results in the arbiter 608 sending a status signal 622 indicating that the bus 611 is idle or not in use.

FIG. 8A involves the checking of the arbiter 608 of any external bus request signal. In this case, from FIG. 8a, the arbiter 608 receives a busrequest 623 from arbiter 609 requesting to access the bus 611.

Since none of the bus master from set 600 is requesting to access bus 611, arbiter 608 allows set 604 to utilize its bus; therefore, it grants the request of arbiter 609 by sending busgrant 624. Arbiter 609, upon receiving busgrant 624, sends a local grant signal to the next bus master with the highest priority, which is bus master 605.

Arbiter 607 changes its status signal 622, indicating that the bus 611 is currently in use. The status is sent arbiter priority select 625.

Figure 9:
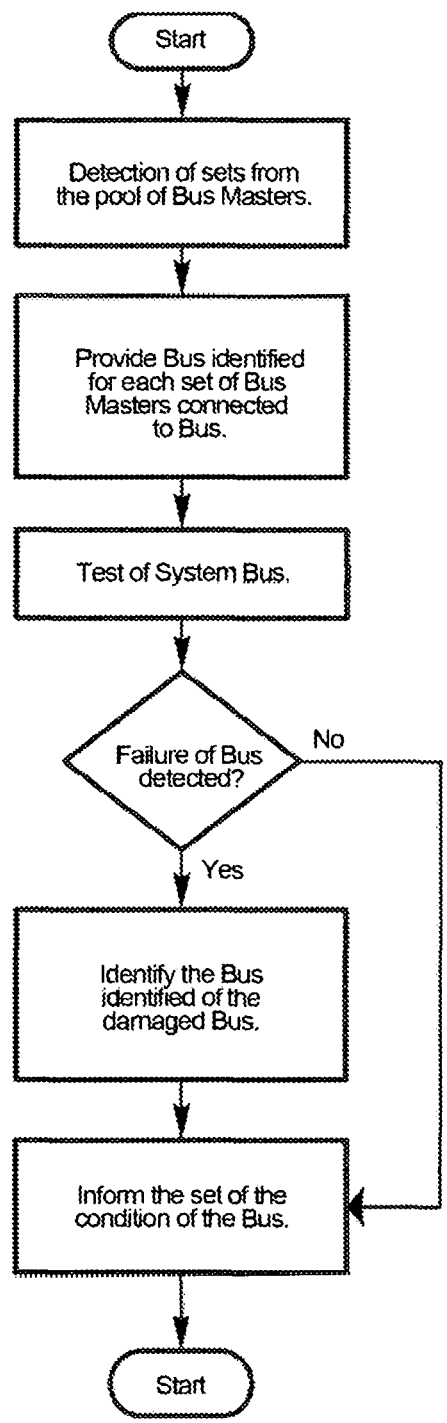
FIGS. 9 and 10 are additional flowcharts showing methods in accordance with embodiments of the invention.

FIG. 9 is a flowchart of a method with the following operations, in accordance with an embodiment of the invention. First, the method performs detection of sets from the pool of bus masters. Next, the method provides a bus identified for each set of bus maters connected to the bus. Next, the method performs test of the system bus. Next, the method can determine if a failure of bus is detected. If there is no failure, the method informs the set of the condition of the bus. If there is a failure, the method will identify the bus as a damaged bus and the method then informs the set of the condition of the bus. The method starts again.

Figure 10:
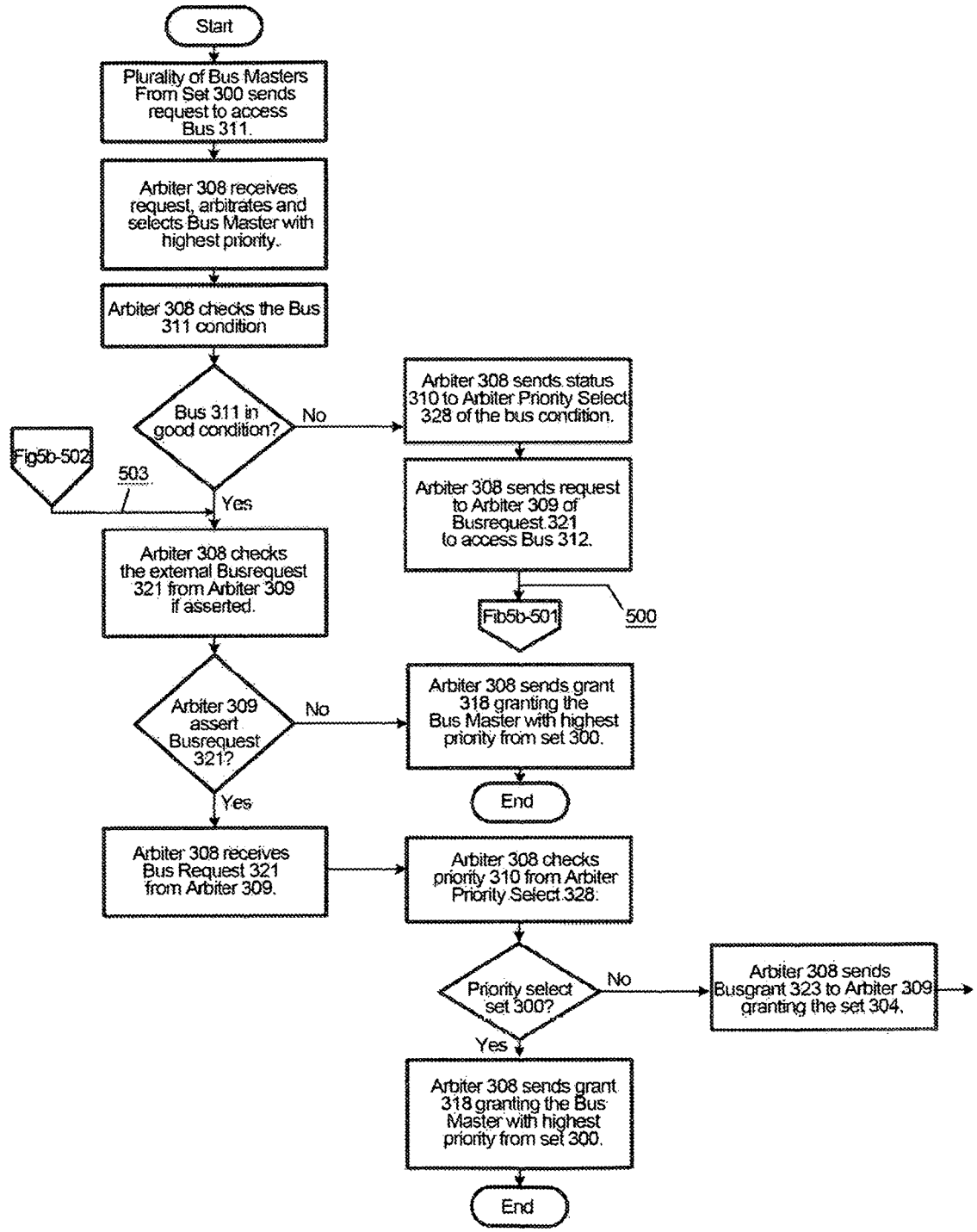

FIG. 10 is a flowchart of a method with following operations, in accordance with an embodiment of the invention. First, a plurality of bus masters from set 300 sends a request to access bus 311. Next, arbiter 308 receives the request, and arbitrates and selects the bus master with the highest
priority. Next, arbiter 308 checks the bus 311 condition. If the bus is in good condition, the arbiter 308 checks the external busrequest 321 from arbiter 309 if asserted and checks if the arbiter 309 asserts busrequest 321, and if asserted (block 502 for FIG. 5B is also input 503 in this operation, arbiter 308
receives the bus request 3021 from arbiter 309; if not asserted, the arbiter 308 sends grant 318 granting the bus master with the
highest priority from set 300 and the method then ends.

In the method, if bus 311 is not in good condition, the arbiter 308 sends status 310 to arbiter priority select 328 of the bus condition, and arbiter 308 sends the request to arbiter 309 of busrequest 321 to access bus 312. The method then proceeds to block 501 in FIG. 5B.

In the method, if the arbiter 309 does not assert the busrequest 321, the arbiter 308 sends grant 318, granting the bus mater with the highest priority from set 300 and the method then ends.

After arbiter 308 receives busrequest 321 from arbiter 309, arbiter checks the priority 310 from arbiter priority select 328. If the priority select is set (300), then arbiter 308 sends busgrant 323 to arbiter 309 granting the set (304). If the priority select is not set (300), then arbiter 308 sends grant 318, granting the bus master with the highest priority from set 300, and the method then ends.

Figure 11:
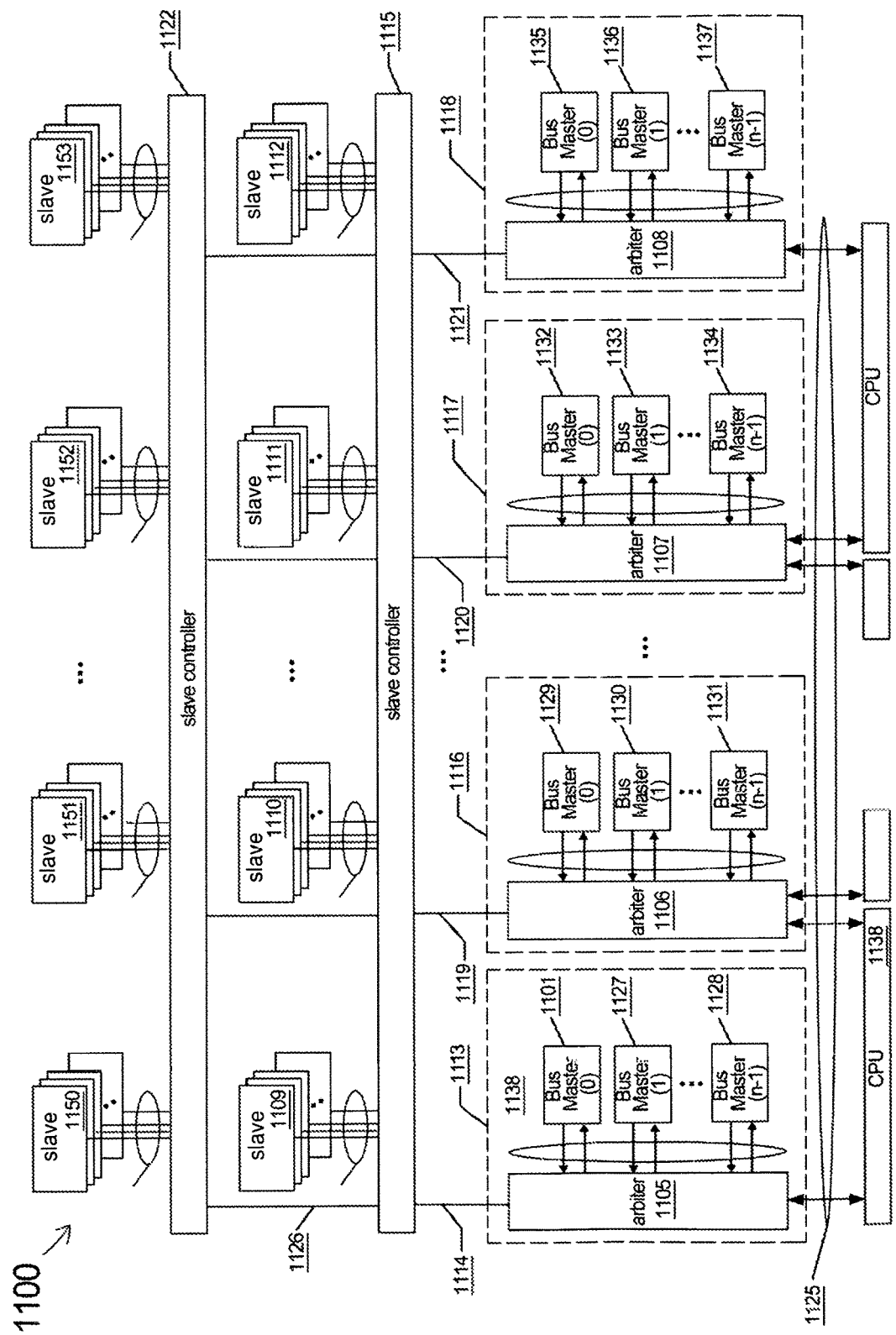
FIG. 11 is a diagram illustrating an embodiment of a system comprising of a plurality of bus masters driving system buses, the system including bus arbiters, slave controllers and slave devices, according to another embodiment of the present invention.

FIG. 11 is a diagram illustrating an embodiment of a system 1100 comprising of a plurality of bus masters driving the system buses, along with bus arbiters, slave controllers and slave devices, according to another embodiment of the present invention. Components in FIG. 11 that are similarly shown in FIG. 1 and/or other drawings will have the same or similar functionalities as described above and will not be repeated for purposes of brevity.

In an embodiment of the invention as shown in FIG. 11, a CPU 1138 is coupled to arbiters 1105 and 1106. Another CPU may be coupled to the arbiters 1107 and 1108. In another embodiment of the invention, each CPU is only coupled to an arbiter instead of the CPU being coupled to a plurality of arbiters. Each CPU manages corresponding arbiters, and manages sets 1113 and 1116 or sets 117 and 1118. Each CPU will execute a firmware that chooses bus re-routing and failover in the event of a bus failure and/or bus routing and bus redundancy for controls and
data transfers in cases of unused, idle or inactive buses, as similarly described above with reference to FIG. 1. The firmware notifies and manages the arbiters when routing and bus failover are performed as similarly described above.

In one embodiment of the invention, the distributed bus 12 of FIG. 1 may be used to connect the slave controllers 115, 122, 123, and 124 (FIG. 1) to the arbiters 1105, 1106, 1107, and 1108 as described above. In another embodiment of the invention, serial flashbuses 1114 and 1126 connect the slave controllers 1115 and 1122 to the arbiters 1105, 1106, 1107 and 1108. Slave controller 1115 is connected to the one or more slaves 1109, one or more slaves 1110, one or more slaves 1111, and/or one or more slaves 1112. Slave controller 1122 is connected to one or more slaves 1150, one or more slaves 1151, one or more slaves 1152, and/or one or more slaves 1113.

The serial flashbuses 1114 and 1126 are connected based on a point-to-point flashbus topology that is described in, for example, commonly-owned and commonly-assigned U.S. patent application Ser. No. 14/217,161, which is
hereby fully incorporated herein by reference.

Figure 12:
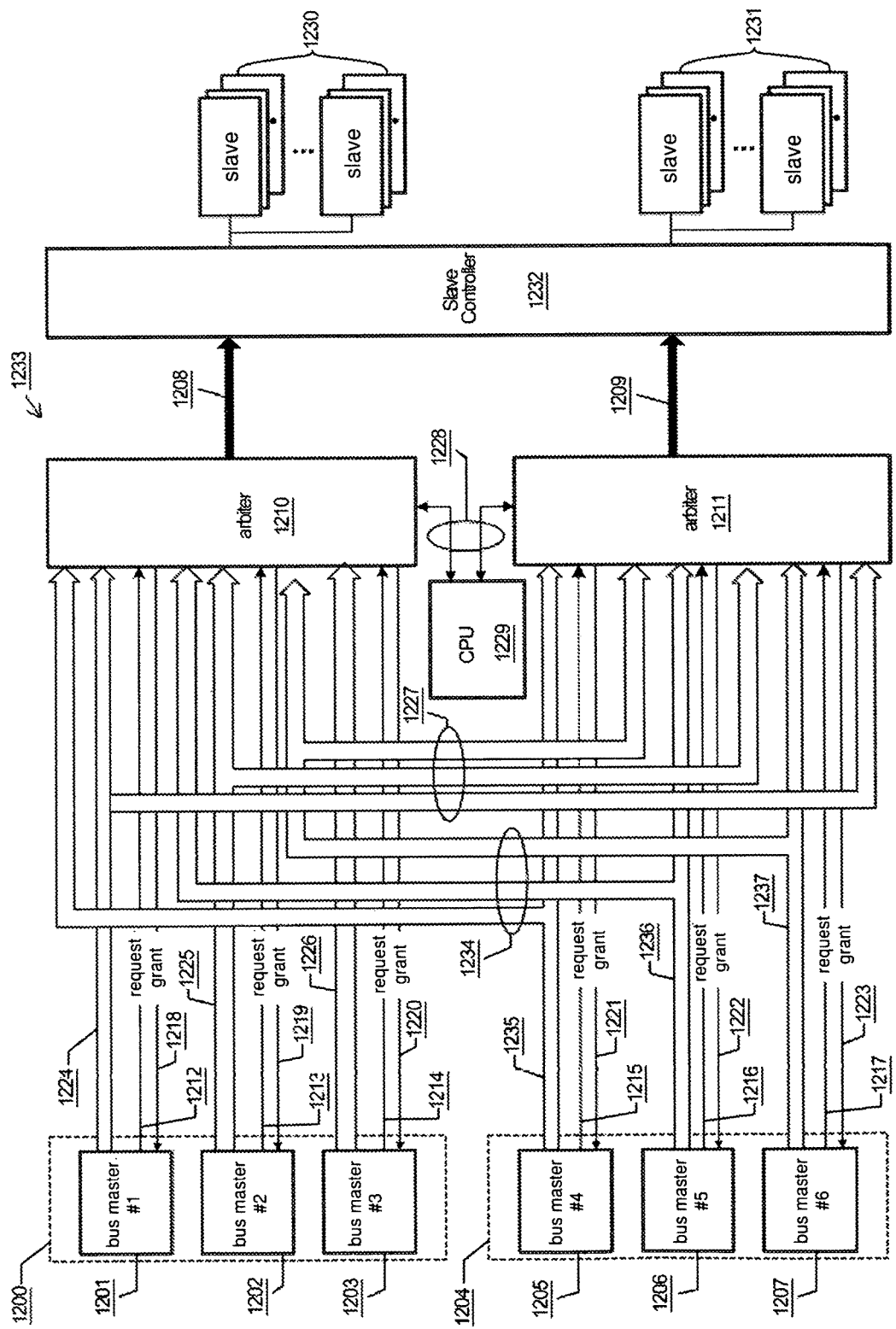
FIG. 12 is a diagram illustrating an example of another embodiment of the present invention.

FIG. 12 is a diagram illustrating an example of another embodiment of the present invention. Components in FIG. 12 that are similarly shown in FIG. 2 and/or other drawings will have the same or similar functionalities as described above and will not be repeated for purposes of brevity.

As shown, CPU 1229 is coupled to and communicates with the arbiters and 1211 instead of an arbiter priority selected 229 as in FIG. 2. In an embodiment of the invention, arbiters 1210 and 1211 do not communicate with each other, and the CPU 1229 obtains information from the arbiters 1210 and 1211 and commands the arbiters 1210 and 1215 what to do via link 1228, for example, during the process of arbitration in the event of re-routing and failover. The CPU 1229 monitors the health, failure, and/or status of the buses 1208 and 1209 via arbiters 1210 and 1211, respectively. The CPU 1229 also selects the priority between bus 1208 and bus 1209. The CPU 1229 performs the above functions by execution of firmware. Other operations during the event of re-routing and failover between bus 1208 and bus 1209 are similarly described above with reference to FIG. 2.

Figure 13:
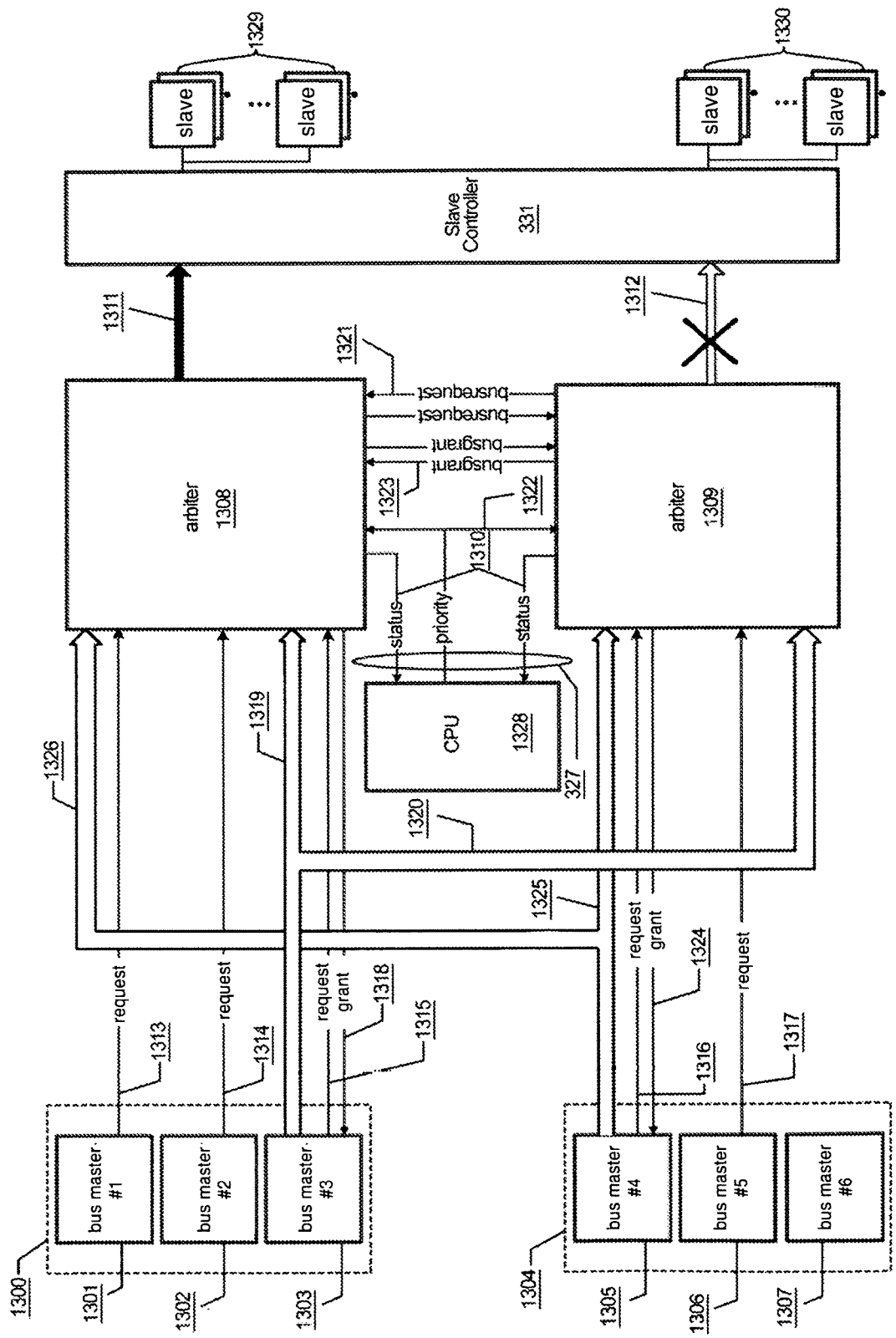
FIG. 13 is a diagram illustrating an example of a system including a failover mechanism that functions in the event of a bus failure, according to another embodiment of the present invention.

FIG. 13 is a diagram illustrating an example of a system in the event of a bus failure where the failover mechanism functions according to another embodiment of the present invention. Components in FIG. 13 that are similarly shown in FIG. 3 and/or other drawings will have the same or similar functionalities as described above and will not be repeated for purposes of brevity.

A CPU 1328 is coupled to and communicates with the arbiters 1308 and 1309 instead of arbiter priority select 328 of FIG. 3. In an embodiment of the invention, arbiters 1308 and 1309 can communicate with each other to a limited extent, and the CPU 1328 obtains information from the arbiters 1308 and 1309 and commands the arbiters 1308 and 1309 via link 1327, for example, during the process of arbitration in the event of re-routing and failover. The CPU 1328 monitors the health, failure, and/or status of the buses 1311 and 1312 via the arbiters 1308 and 1309, respectively. CPU 1310 also selects the priority between bus 1311 and bus 1312 via signal 1322. CPU 1229 performs the above functions by execution of firmware. Other operations during the event of re-routing and failover between bus 1311 and bus 1312 are similarly described above with reference to FIG. 3. However, arbiters 1308 and 1309 include additional intelligence because the arbiters 1308 and 1309 can send bus requests signals 1321 to each other and send bus grant signal 1323 to each other, as similarly described above with reference to FIG. 3.

Figure 14:
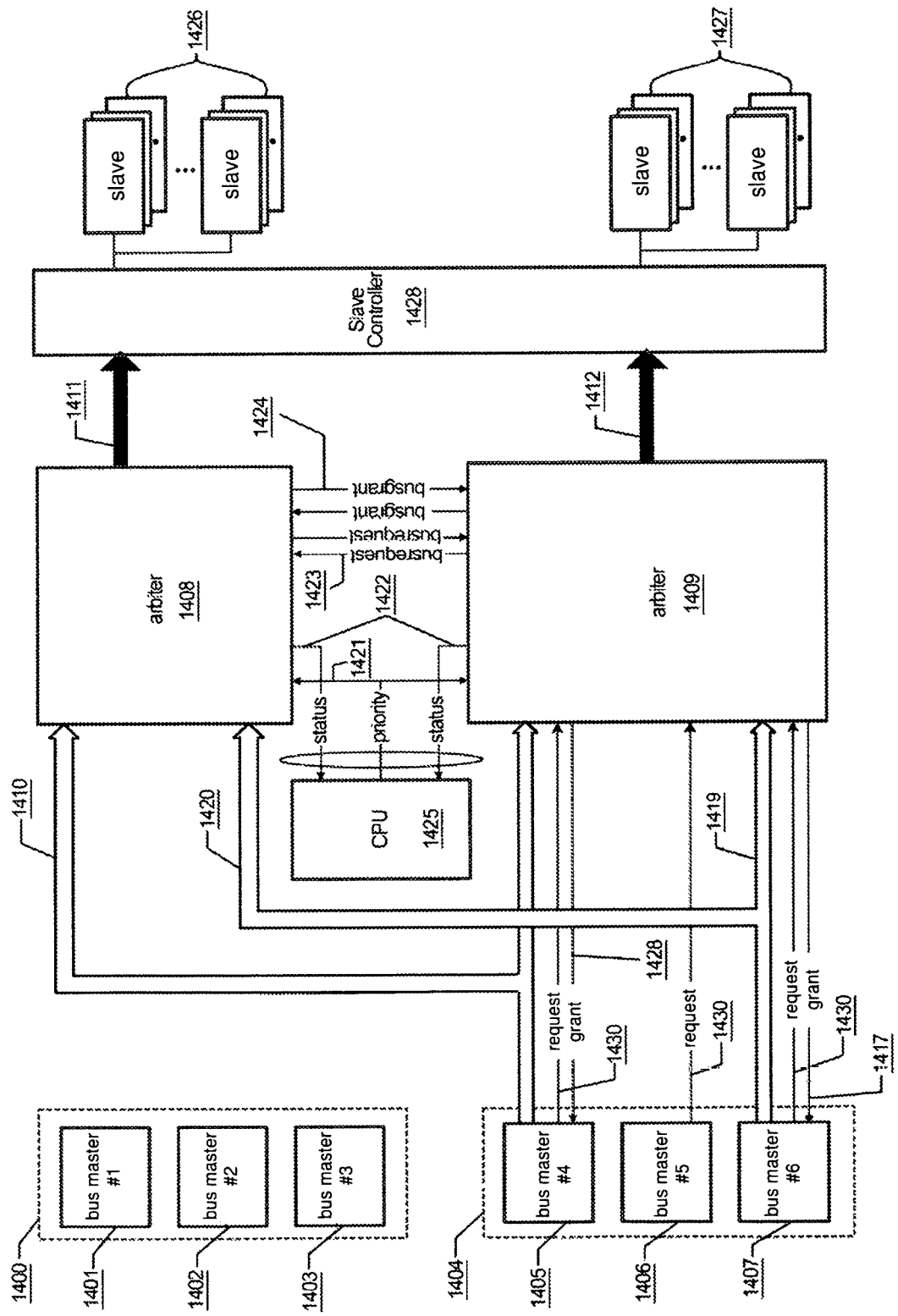
FIG. 14 is a diagram illustrating an example of a system performing bus re-routing according to another embodiment of the present invention.

FIG. 14 is a diagram illustrating an example of a system performing bus re-routing according to another embodiment of the present invention. Components in FIG. 14 that are similarly shown in FIG. 6 and/or other drawings will have the same or similar functionalities as described above and will not be repeated for purposes of brevity.

A CPU 1425 is coupled to and communicates with the arbiters 1408 and 1409 instead of an arbiter priority select 625 of FIG. 6. In an embodiment of the invention, arbiters 1408 and 1409 can communicate with each other to a limited extent, and the CPU 1425 obtains information from the arbiters 1408 and 1409 and commands the arbiters 1308 and 1309, for example, during the process of arbitration in the event of re-routing. The CPU 1425 monitors the health, failure, and/or status of the buses 1411 and 1412 via the arbiters 1408 and 1409, respectively, via status signals 1422. The CPU 1425 also selects the priority between the bus 1411 and bus 1412 via priority signal 1421. The CPU 1425 performs the above functions by execution of firmware. Other operations during the event of re-routing between bus 1411 and bus 1412 (and other operations concerning bus 1411 and 1412) are similarly described above with reference to FIG. 6. However, the arbiters 1408 and 4309 include additional intelligence because the arbiters 1408 and 1409 can send bus requests signals 1423 to each other and send bus grant signals 1424 to each other, as similarly described above with reference to FIG. 6.

Figure 15:
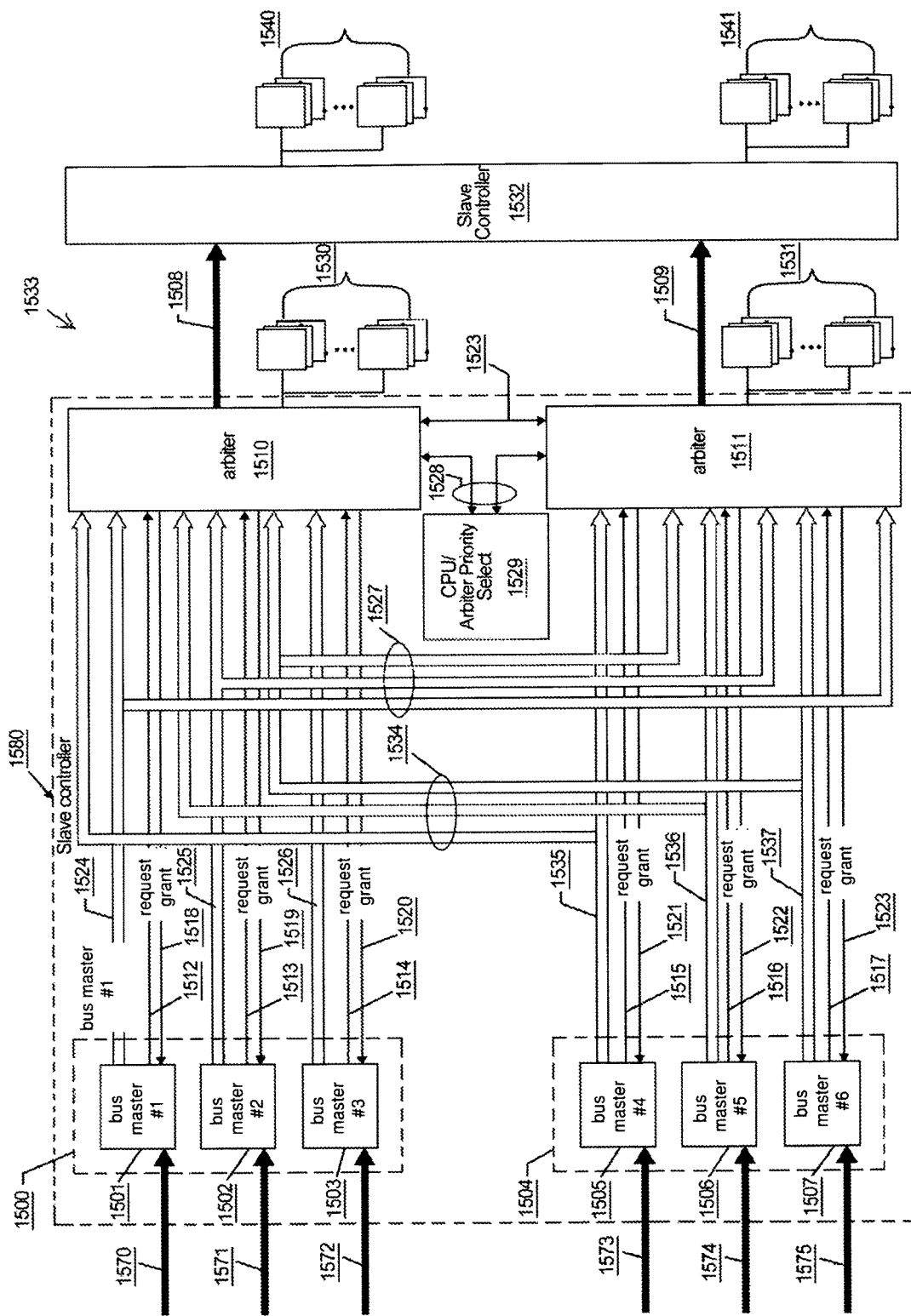
FIG. 15 is a diagram illustrating an example of a system performing bus re-routing according to another embodiment of the present invention.

FIG. 15 is a diagram illustrating an example of a system performing bus re-routing according to another embodiment of the present invention. FIG. 15 also shows additional details of a slave controller 1580 that can represent details of slave controllers 1115 and 1122 in FIG. 11, in an embodiment of the invention.

Components in FIG. 15 that are similarly shown in FIG. 12 and/or other drawings will have the same or similar functionalities as described above and will not be repeated for purposes of brevity.

Ingress channels (e.g., flashbus) 1570, 1571, and 1572 are coupled to the bus masters 1501, 1502, and 1503, respectively, in set 1500, while ingress channels (e.g., flashbus) 1573, 1574, and 1575 are coupled to the bus masters 1505, 1506, and 1507, respectively, in set 1504. Egress channels (e.g., flashbus) 1508 and 1509 are coupled to the slave controller 1580 (via the arbiters 1510 and 1511, respectively) and are also coupled to the slave controller 1532. Similarly in FIG. 11, the ingress channels (e.g., flashbus) 1114, 1119, 1120, and/or 1121 are coupled to the slave controller 1115 and the egress channels (e.g., flashbus) 1126 are coupled to the slave controller 1115 and 1122.

FIG. 15 shows the operations of re-routing and/or failover that can be performed in serial Flashbus topology among slave controllers (e.g., slave controllers 1580 and 1532). The block 1529 communicates with the arbiter 1510 and arbiter 1511 and can be an arbiter priority select with functionalities as described above or a CPU with functionalities as described above. Therefore, by use of a CPU 1529 or an arbiter priority select 1529, the slave controller 1580 can decide re-routing or failover between the bus 1508 and 1509. As similarly described above, the communications between the arbiters 1510 and 1511 via the communication link 1523 is optional and may be an omitted function. The system or apparatus in FIG. 15 is also expandable in that an additional slave controller (or a plurality of slave controllers connected to each other in series) can be connected to the output ports of the slave controller 1532 and/or can be connected to the input ports of the slave controller 1580, and thus, the configuration of slave controllers in the system of FIG. 15 is expandable. Additionally, re-routing and/or failover between the bus 1508 and bus 1509 in a crisscross manner, as similarly described above, may be performed in the system of FIG. 15. Other operations during the event of re-routing and failover between bus 1508 and bus 1509 are similarly described above with reference to FIGS. 2 and 12.

In another embodiment of the invention, all of buses shown in FIG. 15 (e.g., 1570, 1571, 1572, 1573-1575), 1509, 1508 and all other buses shown in FIG. 15 are bi-directional buses. Circuit components and/or bus pairs may be used to make these buses transmit data in a bi-directional transmission.

The following features may be common components or concepts for all figures. An arbiter priority Select can also be a simple set of configuration registers with fixed or semi-fixed settings or a complex set of state machines or registers with fixed or semi-fixed setting. The values in the set of configuration registers determine the priority and/or failover operations between the bus 1508 and bus 1509. Hence multiple transactions may occur using these fixed settings. For example, if flashbus 1509 goes down or fails, an arbiter priority select 1520 can be set permanently to move all bus transactions to 1508 instead. The Arbiter Priority Select 1529 may or may not be set on-the-fly depending on the method of setting the arbiter Priority Select, and the time to failover to the surviving bus (bus 1508 in this example) and to shut down the failing bus (bus 1509 in this example) may depend on how fast the register setting in the arbiter priority select 1529 are reconfigured. Hence a delay amounting to multiple transaction durations may occur prior to the arbiter Priority Select being set.

Likewise, if the CPU 1520 takes the role of the Arbiter Priority Select, depending on the speed of the CPU, the algorithms within and the physical embodiment of communication link 1528, any updated settings may or may not be set on-the-fly. Hence a delay amounting to multiple transaction durations may occur prior to the CPU 1520 indicating the priority to the Arbiters 1510 and 1511.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising
a plurality of bus masters and a plurality of bus arbiters to support routing and failover wherein the plurality of bus masters comprises a first bus master and a second bus master;
wherein the plurality of bus arbiters comprises a first bus arbiter and a second bus arbiter;
wherein the first bus master is directly coupled to the first bus arbiter;
wherein the second bus master is directly coupled to the second bus arbiter; and
a central processing unit (CPU) coupled to at least one of the first and second bus arbiters;
wherein the CPU is configured to execute a firmware that selects failover in response to a bus failure so that the second bus master is coupled to the first bus arbiter.

2. The apparatus of claim 1, wherein the CPU is configured to execute the firmware, wherein the firmware chooses bus routing or bus redundancy in response to an unused bus, an idle bus, or an inactive bus.

3. The apparatus of claim 1, further comprising:
a serial flashbus that connects the plurality of arbiters to a slave controller.

4. The apparatus of claim 3, wherein the slave controller is connected to at least one slave.

5. The apparatus of claim 1, further comprising
a distributed bus that connects the plurality of arbiters to a slave controller.

6. The apparatus of claim 5, wherein the slave controller is connected to at least one slave.

7. The apparatus of claim 1, wherein the CPU obtains information from the plurality of arbiters and commands the plurality of arbiters during failover.

8. The apparatus of claim 1, wherein the plurality of arbiters can send and receive bus request signals and bus grant signals.

9. The apparatus of claim 1, further comprising:
a slave controller coupled via a plurality of buses to the plurality of arbiters, wherein the slave controller is configured to select failover across the plurality of buses.

10. A method, comprising:
choosing, by a central processing unit (CPU) coupled to a plurality of bus arbiters, failover in response to a bus failure in an apparatus;
wherein the apparatus comprises a plurality of bus masters comprising a first bus master and a second bus master;
wherein the apparatus comprises the plurality of bus arbiters comprising a first bus arbiter and a second bus arbiter;
wherein the first bus master is directly coupled to the first bus arbiter;
wherein the second bus master is directly coupled to the second bus arbiter; and
wherein during the failover, the second bus master is coupled to the first bus arbiter.

11. The method of claim 10, further comprising:
choosing, by the CPU, bus routing or bus redundancy in response to an unused bus, an idle bus, or an inactive bus.

12. The method of claim 10, wherein a serial flashbus connects a plurality of arbiters to a slave controller.

13. The method of claim 12, wherein the slave controller is connected to at least one slave.

14. The method of claim 10, wherein a distributed bus connects a plurality of arbiters to a slave controller.

15. The method of claim 14, wherein the slave controller is connected to at least one slave.

16. The method of claim 10, further comprising:
obtaining, by the CPU, information from the plurality of arbiters; and
commanding, by the CPU, the plurality of arbiters during failover.

17. The method of claim 10, further comprising:
sending and receiving, by the plurality of arbiters, bus request signals and bus grant signals.

18. The method of claim 10, further comprising:
deciding, by a slave controller, failover across a plurality of buses.

19. An article of manufacture, comprising:
a non-transitory computer-readable medium having stored thereon instructions operable to permit an apparatus to perform a method comprising:
choosing, by a central processing unit (CPU) coupled to a plurality of bus arbiters, failover in response to a bus failure;
wherein the apparatus comprises a plurality of bus masters comprising a first bus master and a second bus master;
wherein the apparatus comprises the plurality of bus arbiters comprising a first bus arbiter and a second bus arbiter;
wherein the first bus master is directly coupled to the first bus arbiter;
wherein the second bus master is directly coupled to the second bus arbiter; and
wherein during the failover, the second bus master is coupled to the first bus arbiter.

20. The article of manufacture of claim 19, wherein the method further comprises: choosing, by the CPU, bus routing or bus redundancy in response to an unused bus, an idle bus, or an inactive bus.

21. The method of claim 10, wherein the apparatus comprises a distributed bus that connects the plurality of bus arbiters to a slave controller.

22. The article of manufacture of claim 19, wherein the apparatus comprises a distributed bus that connects the plurality of bus arbiters to a slave controller.

* * * * *